US008214875B2

(12) United States Patent
John et al.

(10) Patent No.: US 8,214,875 B2
(45) Date of Patent: Jul. 3, 2012

(54) NETWORK SECURITY POLICY ENFORCEMENT USING APPLICATION SESSION INFORMATION AND OBJECT ATTRIBUTES

(75) Inventors: Pramod John, Hayward, CA (US);
Ai-Lan Chang, Fremont, CA (US);
Daniel J. Lassig, Castro Valley, CA (US); Rendell K. G. Fong, San Jose, CA (US); Emmanuel W. Jee, Davis, CA (US)

(73) Assignee: VMware, Inc., Palo Alto, CA (US)

( * ) Notice: Subject to any disclaimer, the term of this patent is extended or adjusted under 35 U.S.C. 154(b) by 1248 days.

(21) Appl. No.: 11/440,663

(22) Filed: May 24, 2006

(65) Prior Publication Data

US 2006/0236370 A1    Oct. 19, 2006

Related U.S. Application Data

(63) Continuation-in-part of application No. 11/042,842, filed on Jan. 25, 2005.

(60) Provisional application No. 60/548,047, filed on Feb. 26, 2004.

(51) Int. Cl.
*H04L 29/06* (2006.01)
(52) U.S. Cl. ..................... 726/1; 726/2; 726/3
(58) Field of Classification Search .................. 726/1, 2, 726/11
See application file for complete search history.

(56) References Cited

U.S. PATENT DOCUMENTS

| 5,774,650 | A | * | 6/1998 | Chapman et al. ................. 726/7 |
| 5,787,253 | A | | 7/1998 | McCreery et al. |
| 6,219,706 | B1 | * | 4/2001 | Fan et al. ..................... 709/225 |
| 6,233,577 | B1 | | 5/2001 | Ramasubramani et al. |
| 6,292,838 | B1 | | 9/2001 | Nelson |
| 6,301,658 | B1 | | 10/2001 | Koehler et al. |
| 6,466,932 | B1 | * | 10/2002 | Dennis et al. ................... 710/33 |
| 6,519,571 | B1 | | 2/2003 | Guheen et al. |
| 6,553,428 | B1 | * | 4/2003 | Ruehle et al. ................. 719/330 |
| 6,622,151 | B1 | * | 9/2003 | Hamamoto et al. ......... 709/232 |
| 6,651,099 | B1 | | 11/2003 | Dietz et al. |
| 6,662,227 | B2 | | 12/2003 | Boyd et al. |
| 6,678,740 | B1 | | 1/2004 | Rakib et al. |
| 6,804,701 | B2 | | 10/2004 | Muret et al. |
| 6,871,284 | B2 | | 3/2005 | Cooper et al. |
| 6,983,379 | B1 | | 1/2006 | Spalink et al. |
| 7,020,082 | B2 | | 3/2006 | Bhagavath et al. |

(Continued)

FOREIGN PATENT DOCUMENTS

EP    1054529 A2    11/2000

OTHER PUBLICATIONS

Office Action for U.S. Appl. No. 11/042,842, mailed Feb. 12, 2009.

(Continued)

*Primary Examiner* — Jason Gee

(57) ABSTRACT

A packet traversing on the computer network is received; session information is generated from the packet with the session information including a client network address and a server network address; the packet is associated with at least one object attribute from the directory by using the session information; and a security policy defined for the network environment is enforced by using the session information and the object attribute(s) to determine whether the packet violates the security policy.

43 Claims, 7 Drawing Sheets

U.S. PATENT DOCUMENTS

| | | | |
|---|---|---|---|
| 7,085,936 | B1 | 8/2006 | Moran |
| 7,133,916 | B2 | 11/2006 | Schunemann |
| 7,216,162 | B2 | 5/2007 | Amit et al. |
| 7,433,943 | B1 | 10/2008 | Ford |
| 7,941,827 | B2 | 5/2011 | John et al. |
| 8,024,779 | B2 | 9/2011 | John et al. |
| 2001/0032258 | A1 | 10/2001 | Ishida et al. |
| 2001/0039579 | A1 | 11/2001 | Trcka et al. |
| 2002/0032855 | A1* | 3/2002 | Neves et al. ............ 713/154 |
| 2002/0110084 | A1* | 8/2002 | Butt et al. .............. 370/230 |
| 2002/0131764 | A1* | 9/2002 | David et al. ............ 386/69 |
| 2003/0135553 | A1 | 7/2003 | Pendakur |
| 2003/0163581 | A1 | 8/2003 | Moran et al. |
| 2003/0172143 | A1 | 9/2003 | Wakayama |
| 2003/0177383 | A1 | 9/2003 | Ofek et al. |
| 2003/0237002 | A1* | 12/2003 | Oishi et al. ............ 713/201 |
| 2004/0008972 | A1 | 1/2004 | Haken |
| 2004/0049294 | A1 | 3/2004 | Keene et al. |
| 2004/0071130 | A1 | 4/2004 | Doerr et al. |
| 2004/0078391 | A1 | 4/2004 | Excoffier et al. |
| 2004/0088537 | A1* | 5/2004 | Swander et al. ......... 713/153 |
| 2004/0117434 | A1 | 6/2004 | Bantz et al. |
| 2004/0133589 | A1 | 7/2004 | Kiessig et al. |
| 2004/0254919 | A1 | 12/2004 | Giuseppini |
| 2005/0050338 | A1 | 3/2005 | Liang et al. |
| 2005/0089048 | A1 | 4/2005 | Chittenden et al. |
| 2005/0193427 | A1 | 9/2005 | John et al. |
| 2006/0123078 | A1* | 6/2006 | Mendiola et al. ......... 709/203 |
| 2006/0179140 | A1 | 8/2006 | John et al. |
| 2007/0050846 | A1 | 3/2007 | Xie et al. |
| 2007/0073633 | A1 | 3/2007 | Gallant et al. |
| 2010/0281527 | A1 | 11/2010 | John et al. |

OTHER PUBLICATIONS

Office Action for U.S. Appl. No. 11/042,842, mailed Sep. 21, 2009.
Office Action for U.S. Appl. No. 11/398,028, mailed Sep. 2, 2009.
PacketMotion Product Overview, print date: 2009.
PacketMotion Corporate Overview, print date: 2009.
PacketMotion Interview, print date: 2009.
Office Action for U.S. Appl. No. 11/398,013, mailed Jan. 9, 2009.
Office Action for U.S. Appl. No. 11/398,014, mailed Jul. 9, 2009.
John Sawyer, "Packet Motion Sentry 2.0.3" Network Computing, Network & System Management, Feb. 13, 2006.
Closing internal User Visibility and Data Governance Gaps with PacketMotion, SANS Institute, Mar. 2008.
Office Action for U.S. Appl. No. 11/042,842, mailed Mar. 8, 2010.
Office Action for U.S. Appl. No. 11/398,013, mailed May 12, 2010.
Notice of Allowance for U.S. Appl. No. 11/398,014, mailed Feb. 23, 2010.
Hassler, V.; "X.500 and LDAP Security: a comparative overview"; Network, IEEE vol. 13, Issue 6, Nov.-Dec. 1999, pp. 54-64.
Claycom, W.R., Shin, Dongwan; "Threat modeling for virtual directory services"; Security Technology, 2009. 43rd Annual 2009 International Carnahan Conference on Oct. 5-8, 2009, pp. 149-154.
Yang, C.S., Liu, C.Y.; Chen, J.H.; Sung, C.Y.; "Design and implementation of secure Web-based LDAP management system"; Information Networking, 2001. Proceedings. 15th International Conference on Jan. 31-Feb. 2, 2001; pp. 259-264.
Office Action for U.S. Appl. No. 11/398,014, mailed Jul. 23, 2010.
Notice of Allowance for U.S. Appl. No. 11/398,028, mailed May 12, 2010.
Junaid, M. et al., "Per Packet Authentication for IEEE 802.11 wireless LAN", Multitopic Conference, 2008, INMIC 2008, IEEE International Publication Year: 2008, pp. 207-212.
Huang, C. et al., "One Pass Authentication and Key Arrangement Procedure in IP Multimedia Subsystem for UMTS", Advanced Information Networking and Applications, 2007. AINA '07, 21st International Conference on Publication Year 2007, pp. 482-489.
Iqbal, M.S. et al., "Packet Level Access Control Scheme for Internetwork Security", Communications, Speech and Vision, IEE Proceedings I, vol. 139, Issue 2. Publication Year: 1992, pp. 165-175.
Office Action for U.S. Appl. No. 11/398,013, mailed Jan. 20, 2011.
Notice of Allowance for U.S. Appl. No. 11/398,014, mailed Feb. 28, 2011.
Notice of Allowance for U.S. Appl. No. 11/398,014, mailed Mar. 18, 2011.
Notice of Allowance for U.S. Appl. No. 11/398,028, mailed Jun. 9, 2011.
Office Action in U.S. Appl. No. 11/042,842, mailed Oct. 13, 2010.
Office Action in U.S. Appl. No. 11/398,028, mailed Nov. 3, 2010.
Office Action for U.S. Appl. No. 11/398,014 mailed Jul. 12, 2010.
Office Action in U.S. Appl. No. 11/042,843 mailed Mar. 8, 2010.
Office Action in U.S. Appl. No. 11/398,014 mailed Jul. 23, 2010.

* cited by examiner

NETWORK SECURITY POLICY ENFORCEMENT USING APPLICATION SESSION INFORMATION AND OBJECT ATTRIBUTES

CROSS-REFERENCE TO RELATED APPLICATIONS

This application is a continuing-in-part application, which claims the benefit of United States patent application, entitled "Secure Enterprise Network", having Ser. No. 11/042,842 and a filing date of 25 Jan. 2005, which in turn claims the benefit of United States provisional patent application, entitled "Secure Enterprise Network," having Ser. No. 60/548,047 and the filing date of 26 Feb. 2004.

FIELD OF THE INVENTION

The present invention pertains to network security policy enforcement and reporting.

BACKGROUND OF THE INVENTION

The adoption of networked computing has greatly increased the ability to obtain and share information efficiently on a worldwide basis. The pervasiveness and efficiency of network computing, however, can be used to the detriment of its users, as evidenced by the ease in which computer viruses may be spread, intellectual property may be stolen and private personal information disclosed to third parties. To minimize, eliminate or manage these threats, users have employed a variety of security solutions that precludes users from using applications or transceiving certain data on a networked environment. However, these solutions, such as firewalls, spam filters and the like, have limited means for distinguishing between permitted and restricted types of data. Distinguishing between permitted and restricted types of data is important because many applications have multiple purposes.

For example, an email application can be used by an employee to communicate with an employer's customers but can also be used to communicate with a third party in a manner that is not related to the employer's business, thereby reducing that employee's productivity and wasting company resources. In another example, an Instant Messaging application may be used by an organization as a low cost recipient-aware communications medium. However, the ubiquity of Instant Messaging may also lead some of the organization members to use Instant Messaging for purposes other than those intended by the organization.

Consequently, a need exists for an improved solution for providing network security that accurately logs, blocks or both the occurrence of selected activity on a networked environment, reducing the likelihood of blocking or reporting permissible types of activity or data.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE EMBODIMENTS OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

Element numbers are used throughout this disclosure, including the drawings. The variable "n" is used to indicate the total number of element instances, which may be equal to or greater than the number two.

The various embodiments of the present invention disclosed herein generally relate to a solution for providing security on a networked environment having a directory service that maintains a directory of objects. In accordance with one embodiment of the present, a packet traversing on the computer network is received; session information is generated from the packet with the session information including a client network address and a server network address; the packet is associated with at least one object attribute from the directory by using the session information; and a security policy defined for the network environment is enforced by using the session information and the object attribute(s) to determine whether the packet violates the security policy.

Associating the session information with at least one object attribute may be accomplished using at least one embodiment taught in the United States patent application entitled, "Monitoring Network Traffic by Using a Monitor Device" and having Ser. No. 11/398,014, named the "Monitor Device Patent" or in the United States patent application entitled, "Monitoring Network Traffic by Using Event Log Information" and having Ser. No. 11/398,013, named the "Security Log Patent".

Figure 1:
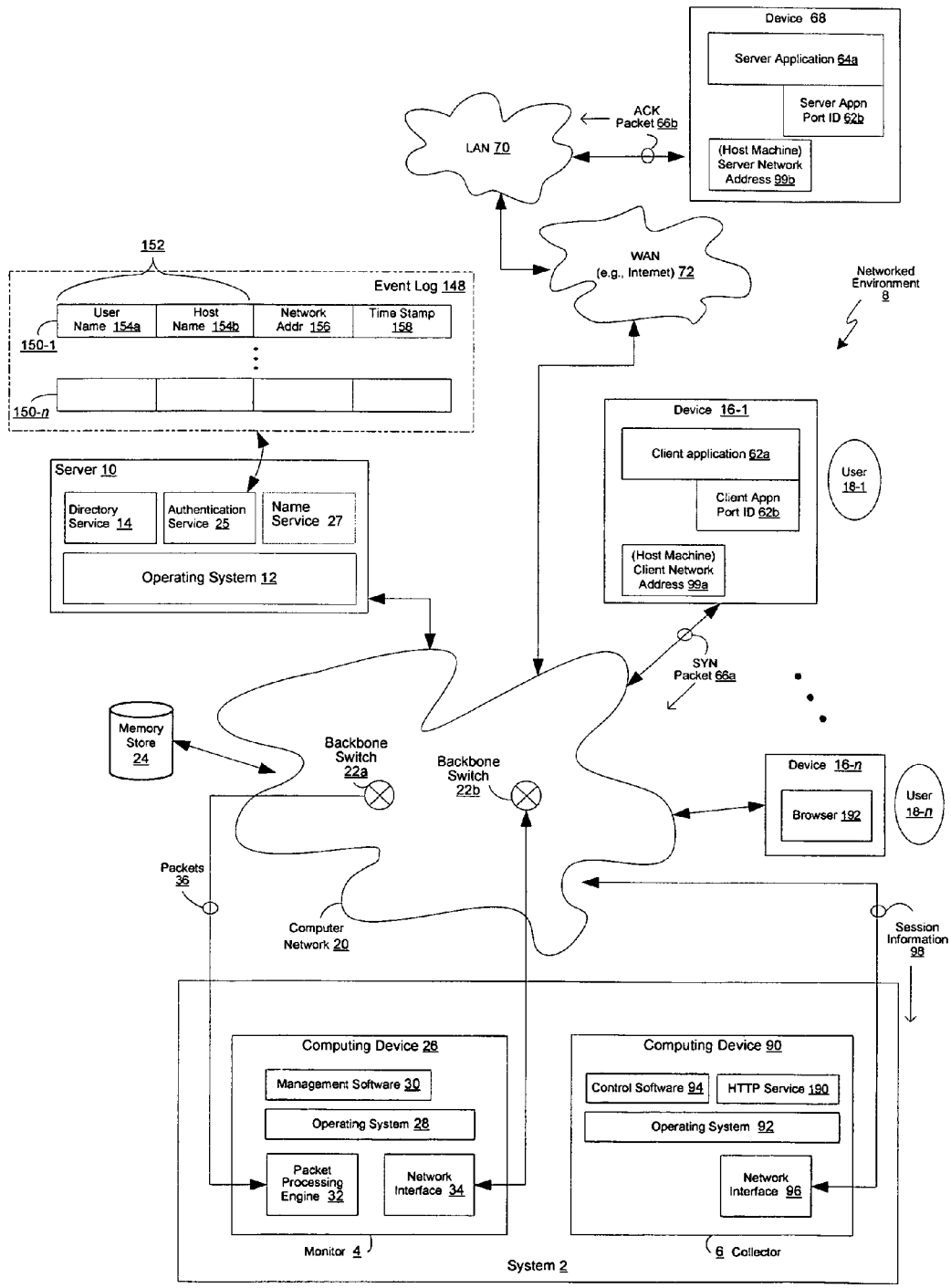
FIG. 1 is a block diagram that includes a computer system for enforcing a security policy defined for a networked environment in accordance with various embodiments of the present invention.

FIG. 1 depicts a system 2 that may be used for providing network security on a networked environment. System 2 includes a monitor 4 and a collector 6 and is intended for use with a local area network, wide-area network or equivalent networked environment, such as networked environment 8. Networked environment includes a server 10 having an operating system 12, and a software application that provides directory services, hereinafter directory service 14, to one or more network entities, such as devices 16-1 through 16-n, real users 18-1 through 18-n, or any combination of these, that request and receive directory services from server 10 using a suitable computer network 20. Memory store 24 is also shown and may either be part of networked environment 8 or system 2.

If various embodiments taught in the Monitor Device Patent are used to associate session information with at least one object attribute, server 10 also includes a software application that provides authentication services, such as authentication service 25, and in an alternative embodiment, may also include a software application that provides name services, such as name service 27.

Monitor 4 may be implemented by using a computing device 26 having at least an operating system 28 and a software application, hereinafter called management software 30, a system bus having at least one expansion slot (not shown) suitable for coupling to a packet processing engine 32, and a network interface 34 for coupling to collector 6 using networked environment 8 via computer network 20. Computing device 26 may be any computer having at least one CPU, a motherboard having system memory, a chipset for supporting the functions of the motherboard, user interfaces, such as keyboard, mouse and monitor and the system bus, and mass storage, such as a hard disk drive. The system bus may be any bus or interconnect, such as PCI, PCI-X, Hypertransport, PCI express and the like, that is suitable for coupling to the packet processing engine selected, such as packet processing engine 32.

Network interface 34 may be any interface suitable for connecting to computer network 20. For example, if computer network 20 is implemented in the form of a packet-switched Ethernet network, network interface 34 would be implemented using an Ethernet-compatible network interface card or equivalent. In another example, computer network 20 is implemented so that it complies with a cell relay network protocol, such as the ATM (Asynchronous Transfer Mode) protocol, requiring a device, such as computing device 26, connected to computer network 20 to have a network interface, such as network interface 34, that is compatible with the cell relay network protocol or ATM protocol. The ATM protocol is commonly known by those of ordinary skill in the art.

Computing device 26 may be implemented using a motherboard having the model designation "X6DVA-EG" from Supermicro Computer, Inc. of San Jose, Calif. Computing device 26 may be configured with a single 3.60 GHz Xeon processor, one gigabyte of system memory, an 80 GB hard disk drive, an Ethernet-compatible network interface, which is used to implement network interface 34, and an operating system in the form of Linux®, such as the Linux® operating system, version 2.4.28, available from www.kernel.org, which is maintained by The Kernel Dot Org Organization, Inc. of Palo Alto, Calif.

Packet processing engine 32 may be implemented using a packet processing engine that can receive and process, which includes inspecting, extracting data, and filtering, packets, such as packets 36, from network traffic received from an attachment point, such as backbone switch 22a, according to criteria specified by management software 30. For example, the criteria specified includes identifying and extracting the source and destination network addresses, the source and destination port ID numbers, the transport protocol field value, the payload or any combination of these that are used or delivered by packets 36. Packets 36 are intended to include TCP (Transport Control Protocol) segments or UDP (User Datagram Protocol) datagrams. TCP and UDP are well-known by those of ordinary skill in the art. To facilitate discussion, TCP segments or UDP datagrams that are sent to the Internet Protocol (IP) layer and that receive an IP header are referred to as TCP or UDP packets, respectively, or as packets, collectively, herein.

There are many application programs that use TCP and UDP. Generally, application programs that need a reliable, connection-oriented protocol use TCP, while application programs requiring short latency usually use UDP. Applications programs that typically use TCP in the TCP/IP suite include file transfer application programs that use protocols such as FTP (File Transfer Protocol); TELNET; mail application programs that use protocols such as POP (Post Office Protocol); browsers that use protocols such as HTTP (Hyper Text Transfer Protocol) or HTTPS, which is the security-enhanced version of HTTP; and the like.

Application programs that typically use UDP in the TCP/IP suite include Voice over IP, on-line gaming, streaming media applications and the like. The domain name system (DNS), Simple Network Management Protocol (SNMP), Routing Internet Protocol (RIP), Network File System (NFS) and Dynamic Host Configuration Protocol (DHCP) are also application programs or services, among others, that use UDP to communicate with other application programs.

Application programs that wish to communicate with each other typically establish at least one logical communication pathway, named "pathway", through which the application programs can exchange information, such as data and control parameters. The exchange of information across a pathway is herein named an "application session". The network address and port ID of one of the application programs defines one end of the pathway, while the network address and port ID of the other application program defines the other end of the pathway. The application program's network address and port ID that are used to define one end of the pathway are collectively named a "connection". An application program that requests an application session is named a "client application", while an application program that receives and responds to the request is named a "server application".

The term application program includes any program module or software code that executes a set of related functions, such as word processing, e-mail messaging, instant messaging, file-sharing, voice over IP, video conferencing or the like, as well as network application layer applications that enable an application program to communicate and pass data across one or more computer networks.

Figure 2A:
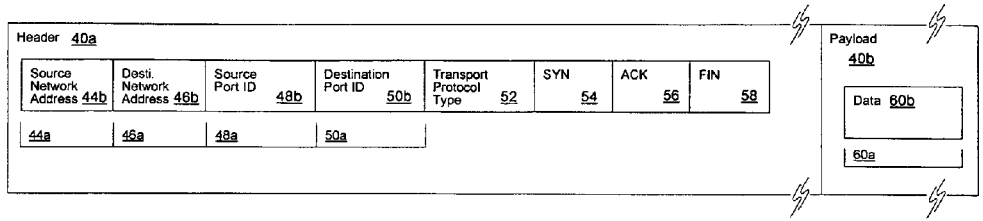
FIGS. 2A and 2B are block illustrations of a TCP and UDP packets, respectively.

As seen in FIG. 2A, a TCP packet 38 includes a TCP/IP header 40a and a payload 40a, which include predefined fields, such as a source address field 44a for holding a source network address 44b, a destination address field 46a for holding a destination network address 46b, a source port field 48a for holding a source port ID 48b, a destination port field 50a for holding a destination port ID 50b; a transport protocol type value 52, which in this example indicates TCP; a SYN bit 54; an ACK bit 56; a FIN bit 58 and a data field 60a for holding data 60b, among others.

Data field 60a is of variable length and contains the data or message sent by a client or server application. When sent from one application program to another application program hosted on a different computing device through a computer network, a TCP packet is further processed by other protocols in the TCP/IP stack, which includes further encapsulation into a form suitable for eventual transmission on a computer network and is not further disclosed to avoid overcomplicating the herein disclosure.

Under TCP and referring to FIGS. 1 and 2A, a client application, such as client application 62a, initiates an application session by sending a SYN request to a server application, such as server application 64a. The SYN request includes the client application's network address 99a and port ID 62b and the server application's network address 99b and port ID 64b, which are respectively encapsulated in the source address, source port ID, destination address and destination port ID fields of a TCP packet having its SYN bit set and its ACK bit not set. This type of TCP packet is herein after referred to as a SYN packet, such as SYN packet 66a in FIG. 1. In a SYN packet, the source address and port ID define a connection at one end of the pathway that will be used during the application session, while the destination address and port ID define another connection at the other end of the pathway. The pair of connections defined in the SYN packet is typically used by the client and server applications to exchange control parameters for the application session, and thus are collectively named herein as a "control connection".

The source address in a SYN packet is typically the network address assigned to a computing device, such as device 16-1, that hosts a client application, such as client application 62a. The client application may be under the direction of a network entity having an object defined for it by directory service 14, such as user 18-1. The destination address in a SYN packet is typically the network address assigned to another computing device, such as device 68, hosting a server application, such as server application 64a. Device 68 may be part of networked environment 8 or another networked environment having a LAN 70 coupled to networked environment 8 via a WAN, such as the Internet 72.

A port ID is a number that is used to identify an application program. Certain application programs are identified using "well-known" or "registered" port IDs. Under RFC 2780, the Internet Assigned Numbers Authority (IANA), of Marina del Rey, Calif. 90292, maintains a registry, named "Port Numbers", of well-known and registered port IDs associated with particular application programs. The Port Numbers registry is incorporated by reference as if fully set forth herein, last updated 28 Apr. 2006, and available from http://www.i-ana.org/assignments/port-numbers.html.

Under both TCP and UDP, the IANA divides port IDs into at least two ranges. Port IDs from 1 to 1023 are well-known ports, and port IDs from 1024 to 49,151 are registered ports. Port IDs that are not these ranges are typically referred to as ephemeral port IDs. Ephemeral port IDs are used as temporary port IDs, and typically do not have a consistently known association with a particular application program. The various embodiments of the present invention are not intended to be limited to the port IDs or application programs currently listed in the Port Numbers registry since this registry is updated from time to time by the IANA.

In a SYN packet, the source port ID is a port ID typically selected on a random basis by the client application and is usually an ephemeral port ID (i.e., not a well-known or registered port ID). The source port ID designates the port ID that should be used by a responding server application. The destination port ID enables the client application to contact a server application hosted by a computing device having the destination address without first querying the computing device for the port ID used by the server application. The destination port ID sent by the client application is typically a well-known or registered port ID since it is typically associated with a particular server application, enabling the client application through its host computing device to route a TCP packet to the server application that is well-known or registered to correspond to that port ID.

The establishment of the application session is completed if the client application receives from the server application an ACK response that corresponds to the initial SYN packet. Under TCP, an ACK response is used to acknowledge a SYN request, completing the establishment of the application session. An ACK response may also be used to define a second connection between the client and server if required by the client and server applications establishing the application session.

For client and server applications that do not require a second pathway, the ACK response includes the server application's network address and port ID, the client application's network address and a selected port ID, which are respectively stored in the source address, source port ID, destination address and destination port ID fields of a TCP packet having its SYN bit set and its ACK bit set, and which are respectively equivalent to the destination network address, destination port ID, source network address and source port ID provided in the initial SYN packet.

A TCP packet that includes a set SYN bit and a set ACK bit is hereinafter named an "ACK packet", such as ACK packet 66b in FIG. 1.

For application programs that use two pairs of connections, such as FTP, an ACK response may be used to establish a second pathway through which the client and server applications can exchange data if the server application uses a destination port ID that is different from the source port ID received from the SYN packet in the ACK packet's destination port ID field. In this case, the server application stores its network address and port ID in the source address and source port ID fields of the ACK packet, defining a connection at one end of the second pathway. To define the connection at the other end of the second pathway, the server application uses the client application's network address by storing it in the destination address field of the ACK packet. The server application previously received the client application's network address from the source address field of the SYN packet to which the server application is responding. The server application also selects a random port ID that is not a well-known or registered port ID (i.e., is an ephemeral port ID), as the destination port ID in the ACK packet.

FTP uses two pathways by sending control information through the first pathway created by the SYN packet and by sending data through the second pathway created by the ACK packet. A participating application program, whether client or server, sends data by including it in the data field of a packet configured to use the pathway defined by an ACK response to an initial SYN packet. The second pathway defined by the ACK packet is typically used by application programs participating in a FTP application session to exchange application messages, including data files. Hence, for FTP, the combination of source and destination addresses and port IDs provided by a client to a server application in a SYN request defines the pathway through which TCP packets containing control parameters will flow. The combination of source and destination addresses and port IDs provided by the server application to the client application in an ACK response defines the logical communication pathway through which TCP packets containing application messages will flow. However, not all application programs require two pairs of connections or two pathways. For example, TELNET and R-LOGIN only use a single pathway comprised of a pair of connections.

Under TCP, after an application session is established, the client and server applications may then conduct their application session by sending packets to each other as required. Typically, for application programs that use FTP, data stored in the data field of a packet sent using the pathway defined by an ACK packet, hereinafter named data pathway, will be treated by the receiving application program as an application message. Data, if any, stored in the data field of a packet sent using the pathway defined by an initial SYN packet, hereinafter named control pathway, will be treated by the receiving application program as control parameters.

The application session may be terminated by the client application when the client sends a FIN request, which includes the client and server applications' control connections used during the application session subject to the FIN request. The client and server application control connections are respectively stored in the source address and port ID and the destination address and port ID fields of a TCP packet having its FIN bit set.

Other types of transport layer protocols may be used other than TCP, such as UDP. UDP is an alternative to TCP within the TCP/IP suite, but unlike TCP, does not guarantee delivery of a packet. Under UDP, a client application and a server application communicate during an application session by sending packets containing the network address and port ID that define the connection for the other application. For example, packets sent by the client application include the network address and port ID associated with the server application, while packets sent by the server application include the network address and the port ID associated with the client application. These connections, like in TCP, define the pathway on which these packets can be properly routed to the participating client or server participating in the application session.

Figure 2B:
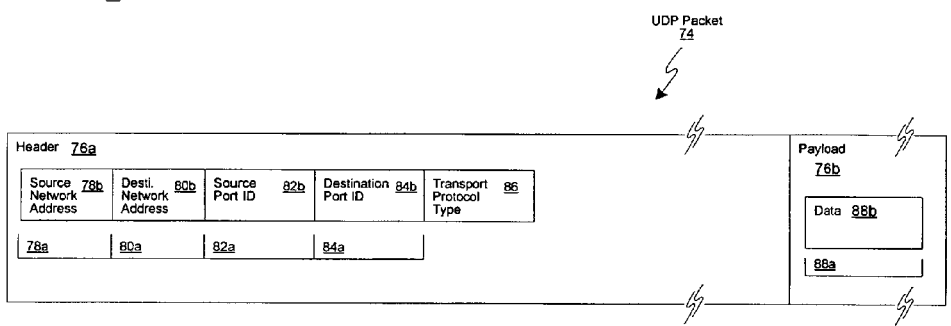

As seen in FIG. 2B, a UDP packet 74 includes a UDP/IP header 76a, payload 76b and predefined fields for holding selected information, such as a source address field 78a for holding a source network address 78b, a destination address field 80a for holding a destination address 80b; a source port field 82a for holding a source port ID 82b; a destination port field 84a for holding a destination port ID 84b; transport protocol type 86 (which in this example indicates UDP); and a data field 88a for holding data 88b. Data field 88a is of variable length is intended to hold data or message, if any, from a client or server application.

Referring again to FIG. 1 and in one embodiment of the present invention, packet processing engine 32 is implemented using a programmable packet processing engine having the model designation "ENP-2611", from RadiSys Corporation of Hillsboro, Oreg. In this implementation, packet processing engine 32 includes at least one Ethernet port (not shown) for attaching to and receiving packets from a suitable attachment point on computer network 20, such as backbone switch 22a. Implementing packet processing engine 32 using model ENP-2611 is not intended to limit the present invention in any way. One of ordinary skill in the art after receiving the benefit of the herein disclosure would readily recognize that other types of network packet processing devices may be used that have the functionality disclosed herein. For example, a general purpose computer may be used alone or in conjunction with at least one network processor, Application Specific Integrated Circuits (ASICs), or a combination of these to provide the disclosed network packet processing disclosed herein. Network processors are commonly known, such as the IXP2400 Network Processor, from Intel Corporation, of Santa Clara, Calif.

In another example, packet processing engine 32 may be replaced with a network interface (not shown) to receive packets 36 and program code operating on computing device 26 to process packets 36 as disclosed by the various embodiments of the present invention described herein.

Collector 6 may be implemented using a computing device 90 having at least an operating system 92, a software application, hereinafter referred to as control software 94, and a network interface 96 for connecting to networked environment 8 via computer network 20. Computing device 90 may be any computer having at least one CPU, a motherboard having system memory, a motherboard chipset, mass storage, such as a hard disk drive. For example, computing device 72 may be implemented using the model having the designation "Proliant Dual 140" from Hewlett-Packard of Palo Alto, Calif. The Proliant Dual 140 is configured with a single 3.60 GHz Xeon processor, one gigabyte of system memory, at least one PCI-x expansion slot, an 80 GB hard disk drive and an Ethernet-compatible network interface, which is used to implement network interface 96. In one embodiment of the present invention, computing device 90 operates using Red Hat Enterprise Linux® WS 2.1, available from Red Hat, Inc. of Raleigh, N.C.

In an alternative example of an embodiment of the present invention, collector 6 may include an additional network interface (not shown) which may be used to directly connect to network interface 34, enabling monitor 4 and collector 6 to communicate with each other without the use of networked environment 8.

Computing devices, such as computing device 26 and 90 are known, and thus, a detailed discussion and view of the hardware configuration for computing device 26 and 90 are not provided to avoid over-complicating the herein discussion.

Networked environment 8 may be implemented using a client-server network application architecture, which is commonly known by those of ordinary skill in the art, and a computer network, such as computer network 20, having a topology and a physical media suitable for supporting the various embodiments disclosed herein, such as a computer network configured to have a packet-switched network topology using the TCP/IP protocol suite on twisted-pair copper physical media. Using a client-server network application architecture, the TCP/IP protocol suite or twisted-pair copper media is not intended to be limiting in any way. For example, other networking protocols, such as OSI (Open Systems Interconnection), or data link protocols, such as ATM (Asynchronous Transfer Mode), may be used in lieu of the TCP/IP protocol suite. The ATM and OSI protocols are commonly known by those of ordinary skill in the art.

Any type of distributed network architecture may be used as long as devices, such as devices 16-1 through 16-n, and authenticated real users, such as real users 18-1 through 18-n, who have logged-on to devices 16-1 through 16-n, respectively, can request and receive directory services, such as from directory service 14. For example, networked environment 8 may provide access to a server, such as server 10, running a Windows® brand operating system, such as Windows® 2003 Server, which typically includes Active Directory. Active Directory is a LDAP-based directory service and is a product of Microsoft Corporation, of Redmond, Wash.

Moreover, using a client-server network application architecture or twisted-pair copper media is not intended to be limiting in any way. Any type of distributed network architecture may be used as long as devices, such as devices 16-1 through 16-n, and authenticated real users, such as real users 18-1 through 18-n, who have logged-on to devices 16-1 through 16-n, respectively, can request and receive directory services, such as from directory service 14. For example, networked environment 8 may provide access to a server, such as server 10, running a Windows® brand operating system, such as Windows® 2003 Server, which typically includes Active Directory. Active Directory is a LDAP-based directory service and is a product of Microsoft Corporation, of Redmond, Wash.

The various embodiments of the present invention disclosed herein are not limited to Windows® brand operating systems or to Active Directory. Other types of operating systems may be used, including UNIX, Linux®, BSD and other UNIX variants, Solaris, Mac OS X and the like. In addition, other types of software applications may be used instead of Active Directory to provide directory services. For example, one of ordinary skill in the art having the benefit of the herein disclosure would recognize that Sun Java Enterprise, available from Sun Microsystems, Inc., of Sunnyvale, Calif.; eDirectory, available from Novell, Inc. of Provo, Utah; and Red Hat Directory Server, available from Red Hat, Inc., Apache Directory Server, available from Apache Software Foundation of Forest Hill, Md., are example directory services that may be used with the various embodiments of the present invention as described herein. Other directory services exist but are not listed to minimize over-complicating this herein disclosure. Further, OpenLDAP, the Kerberos network authentication protocol, hereinafter "Kerberos Protocol", and Samba software may be used to create the directory service functionality described for Active Directory.

The term "directory service" is intended to include a software application that complies with the X.500 standard, which is a commonly known standard developed by the ITU (International Telecommunication Union) and ISO (International Organization for Standardization). A LDAP-based directory service is commonly known and is based on the X.500 standard but uses the TCP/IP protocol suite. The term "LDAP" is also commonly known and is an acronym for Light Weight Directory Protocol, which is a networking protocol for querying, searching and modifying directory services running over TCP/IP. LDAP is defined in terms of the Abstract Syntax Notation One, also referred to as ASN.1, which is a joint standard managed by ISO, and the ITU-T (ITU Telecommunication Standardization Sector). ASN.1 is a standard notation for describing data structures used for representing, encoding, transmitting and decoding data. LDAP is suitable for accessing an X.500 standard-compliant directory service, such as Active Directory.

A directory service is typically used to define, manage and authenticate network entities, such as computing devices, services and real users. Each network entity is treated as an object by the directory service. Each object has a unique name and a set of attributes, and represents a single network entity, such as a user, a computer, a printer, an application, or a shared data source and their respective attributes ("object attributes"). A directory service, such as Active Directory, creates and manages these objects using a hierarchical framework. This framework arranges objects into three broad categories: resources, such as printers; services; and people, such as users and groups. A directory service manages these objects by enabling information to be read from or written to the objects, controlling access to the objects and enforcing directory security policies defined for the objects.

This hierarchical framework may include arranging these objects to belong to a domain. A directory service, such as Active directory, manages the domain in a "namespace" using its DNS name structure. The objects held within a domain can be grouped into containers called, "organizational units". The organizational unit is one level in the hierarchical framework to apply group policies, called group policy objects in Active Directory.

Figure 3:
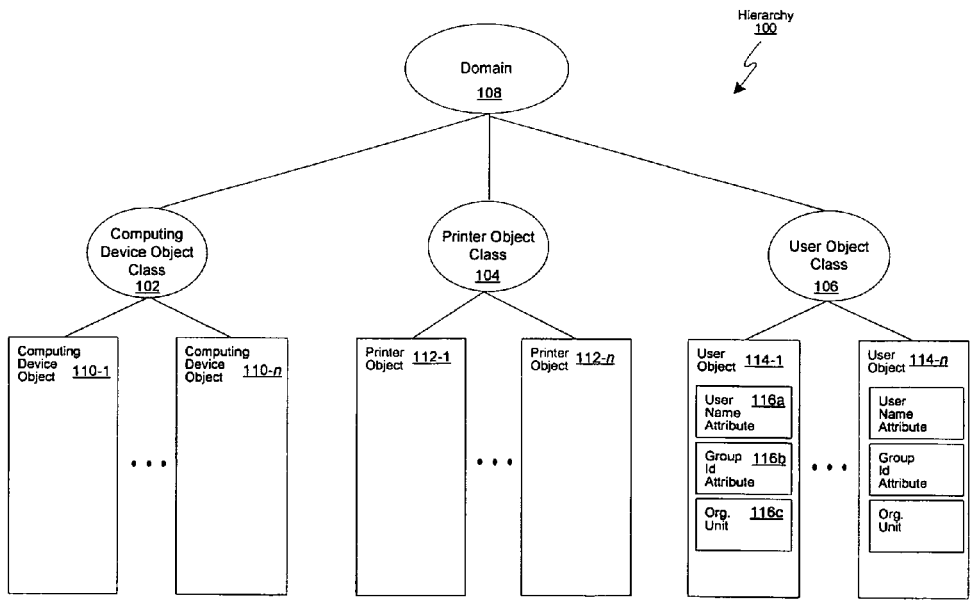
FIG. 3 is a block diagram of an example directory service hierarchy in accordance with yet another embodiment of the present invention.

Turning now to FIG. 3, directory service 14 may have a hierarchy 100 organized according to a selected manner by a system administrator of networked environment 8. Each object in the directory service is typically uniquely identified in the directory and uniquely named for a given namespace, such as a domain. Each object is of a particular object class. For example, hierarchy 100 may include a computing device object class 102, a printer object class 104 and a user object class 106 in a domain 108. Computer objects 110-1 through 110-n represent computing devices, such as devices 16-1 through 16-n, respectively, and belong to computing device object class 104, while printer objects 112-1 through 112-n may represent printers and belong to printer object class 104. Further still, user objects 114-1 through 114-n may represent real users, such as real users 18-1 through 18-n, respectively, and belong to user object class 106.

Each object may have more than one attribute, and each attribute may contain a value. Object attributes define the characteristics of and information related to the network entity represented by the object containing the object attributes. For example, a set of attributes defined in user object 114-1 may include user information related to a real user, such as user name attribute 116a, group ID attribute 116b, and organizational unit attribute 116c. User name attribute 116a may be in the form of an email address that has a suffix portion that includes the domain name established for the networked environment and a prefix portion that is unique to the real user. For example, in one embodiment of the present invention, a user name of: "jdoe@packetmotion.com" may be used for real user 18-1. In Active Directory, the user name attribute in a user object is referred to as the "UserPrincipalName" attribute and requires a value that has an e-mail address format, such as the format disclosed in the example above.

Referring again to FIG. 1, a directory service stores objects in a database, or equivalent memory store, according to a selected model, referred to as a schema. The collection of objects stored in the database is sometimes referred to as a directory. The directory service functions as an interface to the database and provides access to objects stored in the database.

Access to the directory service may be accomplished using LDAP, and the Kerberos Protocol may be used to authenticate network entities seeking access to resources on networked environment 8. The Kerberos Protocol is commonly known and not intended to limit in any way the scope and spirit of the present invention as described in the various embodiments disclosed herein. Other types of network authentication protocols may be used if the protocol selected supports the directory service used.

Computer network 20 enables computing devices to connect and communicate with other devices that are also coupled to networked environment 8. Computer network 20 may be implemented using any physical media that can support the transmission protocol used in networked environment 8. In addition, various types of physical media may be used instead of twisted pair copper physical media, including fiber, coax, wireless, and the like.

Monitor 4 is coupled to computer network 20 in an inline or serial manner, such as by coupling packet processing engine with an attachment point, named backbone switch 22a, and network interface 34 with another attachment point, named backbone switch 22b. This enables monitor 4 to receive and monitor packets, such as packets 36, of the network traffic transmitted from backbone switch 22a and enforce a selected network policy on these packets. Enforcement of the security policy, as described further below, includes returning some or all of the packets received by monitor 4 to computer network 20 through network interface 34 and backbone switch 22b. Those of ordinary skill in the art would readily appreciate after receiving the benefit of this disclosure that the use of backbone switches 22a and 22b is not intended to be limiting in any way. Other approaches may be used as long as monitor 4 is placed in line or in series with a selected transmission path used by packets comprising network traffic traversing on computer network 20 that are targeted for network security enforcement as taught in the various embodiments of the present invention herein.

The term "device" includes any computing device that can request and use application functionality, such as directory services 14, provided by a server, such as server 10, operating on networked environment. In addition, if the disclosure in the Monitor Device Patent is used to associate session information with at least one object attribute, device 16-1 through 16-n may also be configured to respond to a query seeking the log-on status of users having a user account on the client. For example, device 16-1 may be configured with the Microsoft Windows® operating system, such as Windows® XP, to receive and reply to user account query sent by another device using the Server Message Block (SMB) protocol. The SMB protocol is commonly known and a network protocol that supports the sharing of data, files, resources and permits authenticated inter-process communication between computing devices in a networked environment, such as between collector 6 and device 16-1 on computer network 20.

Using a Windows® operating system or the SMB protocol to submit a user account query to a client is not intended to limit the present invention in any way. Other types of operating systems can support a user account query, such as UNIX, which includes the "who" remote shell command that is similar to the user account query supported by the Windows® operating system. SAMBA is a commonly known suite of software applications for defining and operating a computer network and includes an open source implementation of the SMB protocol.

The term "device" includes any computing device, such as a general purpose general, server, hand-held device or the like, that includes an operating system, a network interface compatible with computer network 20, and capable of executing an application program or program code. The term "server" is a subset of computing devices and primarily provides application functionality to another device connecting or connected to networked environment 8. Such application functionality may include directory services, mass storage services, e-mail services, web services and the like. The term "node" includes any computing device, such as system 2, devices 16-1 through 16-n, server 10 and memory store 24, operating on a networked environment, such as networked environment 8 and using a unique network address that was previously granted to the node either manually or automatically, such as through a DHCP, also known as Dynamic Host Configuration Protocol, service (not shown). DHCP services are commonly known.

Server 10 may be implemented using any computing device sufficient to support the server's planned function, such as software-based service applications that include a directory service, e-mail, file system and the like.

The term "memory store" is intended to include any device, such as a storage server, that is capable of providing at least read and write functionality to a requesting computing device, such as system 2, devices 16-1 through 16-n and server 10. In accordance with one embodiment of the present invention, memory store 24 is implemented using any database server capable of communicating with another computing device on networked environment 8 using the SOAP protocol. For example, memory store 24 may be implemented using a database application, such as ORACLE, configured to operate on database server, such as the database server having model designation Oracle 9G, available form Oracle Corporation of Redwood City, Calif.

Using a database server to implement memory store 24 is not intended to limit the scope and spirit of the various embodiments of the present invention disclosed here. One of ordinary skill in the art after receiving the benefit of the herein disclosure would readily recognize that memory store 24 may be implemented on a separate network, such as on a Storage Area Network, commonly referred to as a SAN, implemented using a network attached storage (NAS) device, or implemented using computing device 90 configured with a database application software and a mass storage device, such as hard disk drive or a mass storage array in either a JBOD (Just a Bunch of Disks) or RAID (Redundant Array of Independent Disks) configuration.

Management software 30 and control software 94 are implemented in a selected programming language, such as C# or Java, and compiled for their target operating system, which for both applications in the example shown in FIG. 1, is the Linux® operating system. During operation, management software 30 executes on computing device 26 and communicates with packet processing engine 32 and control software 94. Control software 94 executes on computing device 90 and communicates with management software 30 and a server running a directory service, such as server 10 and directory service 14, respectively. Management software 30 communicates with packet processing engine 32 using a set of Application Program Interfaces (APIs), such as the programming and runtime libraries specific to the ENP-2611 packet processing engine.

Both management software 30 and control software 94 use the SOAP protocol, version 1.2, over HTTP or HTTPS to communicate with each other through network interfaces 34 and 96, respectively. Although network interfaces 34 and 96 are coupled to each other using computer network 20 of networked environment 8, other approaches may be used, such as by coupling network interfaces 34 and 96 directly using a separate physical medium, eliminating the need to use networked environment 8. In addition, control software 94 uses the SOAP protocol to communicate with memory store 24 by using the protocol to read and query data stored on, or write data to, memory store 24. The use of the SOAP protocol in the various embodiments of the present invention is not intended to be limiting in any way. Those of ordinary skill in the art would readily recognize after receiving the benefit of this disclosure that other types of protocols may be used.

The SOAP protocol is commonly known and a protocol for exchanging XML-based messages over a computer network, such as computer network 20. HTTP (hypertext transfer protocol) and the XML language (extensible markup language) are also commonly known. The World Wide Web Consortium commonly referred to as W3C, currently maintains the specifications for SOAP and HTTP.

Control software 94 uses the LDAP protocol to communicate with directory service 14. The use of the LDAP protocol is not intended to limit the scope and spirit of the various embodiments of the present invention disclosed herein. Other protocols may be used as long as the protocol selected is compatible with the type of directory service implemented on networked environment 8.

Further, if the disclosure in the Monitor Device Patent is used to associate session information with at least one object attribute, control software 94 also communicates with clients, such as devices 16-1 through 16-n, on networked environment 8 using the SMB protocol. Control software 94 includes program code that structures and sends a user account query to a selected client, such as device 16-1. The SMB protocol and user account query are compatible with clients using the Microsoft Windows® brand of operation systems, such as Windows® XP Professional. Those of ordinary skill in the art would readily recognize that control software 94 may be provided with additional program code that supports other types of network protocols for sharing of data, files, resources, and permits authenticated inter-process communication between computing devices, such as collector 6 and device 16-1, on a computer network 20.

During operation, system 2 monitors network traffic traversing on networked environment 8, such as network traffic received from backbone switch 22a, and attempts to generate application session information ("session information) 98 from packets 36. Data comprising session information 98 may, for example, have been generated during an application session conducted between client application 62a and server application 64a and includes at least the network addresses 99a and 99b of devices 16-1 and 68, respectively. Devices 16-1 and 68 respectively host client application 62a and server application 64a. Network addresses 99a and 99b are hereinafter named "client network address" 99a and "server network address" 99b, respectively.

Figure 4:
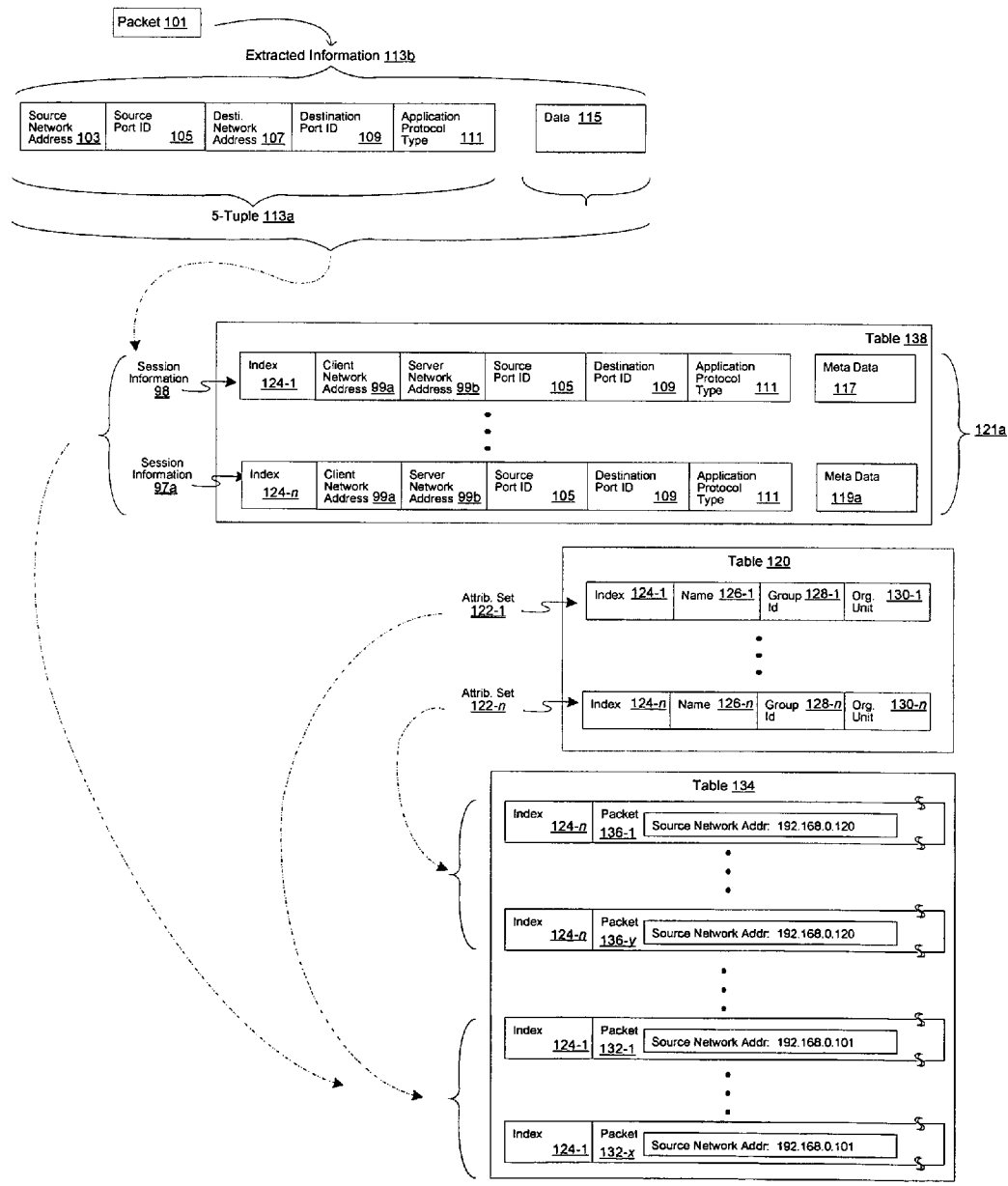
FIG. 4 is a block diagram of example tables for associating session information with an object attribute(s) in accordance with yet another embodiment of the present invention.

Referring to both FIG. 1 and FIG. 4, monitoring network traffic and identifying an application protocol session is accomplished by using collector 6 to instruct monitor 4 to receive packets 36, identify transport messages, such as TCP segments or UDP datagrams, if any, from packets 36 and generate session information 98 from packets 36. In accordance with one embodiment of the present invention, monitor 4 uses packet processing engine 32 to perform the above actions. From each packet received, such as packet 101, monitor 4 generates session information 98 by extracting a source network address 103, source port ID 105, destination network address 107, destination port ID 109 and a transport protocol type 111, such as a TCP or UDP, collectively "quintuple" 113a. Monitor 4 uses the quintuple to obtain the network addresses of the client and server applications conducting the application session from which the packet originated, such as client network address 99a and server network address 99b. Monitor 4 may also extract data 115, if any, from the data field of packet 101. The quintuple and any data extracted from a packet are hereinafter named "extracted information", such as extracted information 113b.

Monitor 4 uses transport protocol type 111 to determine whether the packet is a TCP or UDP packet. If it is a TCP packet, monitor 4 determines whether the TCP packet is a SYN packet, such as by determining whether the packet's SYN bit is set and its ACK bit not set. If so, monitor 4 designates the source network address and destination network address from the SYN packet as the network addresses of the client application and server application, respectively.

If the TCP packet is not a SYN packet or the received packet is a UDP packet, monitor 4 determines whether packet 101 has been previously associated with an object maintained by directory service 14 by sending quintuple 113a to collector 6 and requesting that collector 6 determine whether collector 6 has previously received session information from monitor 4 that includes a quintuple matching quintuple 113a and that has been previously associated with an object. As discussed further below, collector stores session information generated by monitor 4 and attempts to associate the stored session information with objects obtained from directory 14.

If collector 6 finds at least one previously stored session information that has a quintuple matching quintuple 113a and that has been associated with an object, collector 6 returns a response to monitor 4 indicating that quintuple 113a has been previously associated with an object.

If collector 6 does not find at least one previously stored session information that has a quintuple matching quintuple 113a and that has been associated with an object, collector 6 returns a response to monitor 4 indicating that quintuple 113a has not been previously associated with an object. Monitor 4 then analyzes the port IDs from quintuple 113a, such as source port ID 105 and destination port ID 109, to obtain the network address of the client and server applications conducting the application session from which the packet originated.

From quintuple 113a, monitor 4 designates the network address corresponding to a port ID that is a well-known or registered port ID as the server network address. Monitor 4 designates the other network address from extracted information 113 as the client network address. As previously discussed above, a port ID that is less than 1024 is defined as a well-known port ID, while a port ID that is greater than 1023 but less than 49,152 is defined as a registered port ID.

For example, if destination port ID 109 is less than 1024, monitor 4 uses destination port ID 109 as a well-known port ID and uses destination network address 107 as server network address 99b and source network address 103 as client network address 99a. In another example, if the source port ID 105 is less than 1024, monitor 4 uses source port ID as a well-known port ID and uses source network address 103 as server network address 99b and destination network address 107 as client network address 99a.

In accordance with yet another embodiment of the present invention, in addition to or in lieu of using a port ID value to identify a packet as belonging to a particular application program type, monitor 4 performs a content signature analysis of packet 101 by analyzing the contents of packet 101 to determine whether it matches a known protocol encoding associated with certain application program types, such as those listed in Table 1. Protocol encoding used for various application program types are known in the art and thus, is not further discussed herein to avoid over-complication the herein disclosure. If monitor 4 successfully identifies an application program type for packet 101, it designates source network address 103 as server network address 99b and destination network address 107 as client network address 99a. If monitor 4 fails to match an application program type by using content signature analysis, monitor designates source network address 103 as client network address 99a and destination network address 107 as server network address 99b.

After obtaining client and server network addresses 99a and 99b, monitor forwards client and server network address 99a and 99b, source port ID 105, destination port ID 109 and transport protocol type 111 to collector 6, which receives the forwarded information as session information, such as session information 98.

Monitor 4 may also generate metadata, such as metadata 117, using quintuple 113a and data 115. If so, monitor 4 includes metadata 117 as part of session information 98. The term "metadata" includes characteristics particular to an application program category. For example, if client and server applications 62a and 64a are engaged in a file transfer application program category by using an FTP application program, monitor 4 generates metadata by extracting the file name(s) and file type, such as jpeg, mpeg and the like, transferred during the application session.

Table 1 below shows the type of metadata generated by monitor 4 according to application program category. Table 1 also lists example application program types corresponding to a particular application category. The list of application program categories and application program types are not intended to be exhaustive but instead illustrates the types of application program categories and types applicable to the various embodiments of the present invention disclosed herein.

TABLE 1

| Application Program Category | Example Application Program Types | Metadata Generated (Where Applicable and in Any Combination) |
|---|---|---|
| File Transfer | FTP, secure FTP, TFTP | Files name(s), File Type(s), File Size(s) |
| File Access | NFS, SMB, AFS | Files name(s), directory name(s), permissions, time stamp(s), Printer Name(s), File Size(s) |
| Authentication Protocols | Kerberos, RADIUS, VPN, ISAKMP | User name(s), domain name(s), expiry times, authentication times |
| Web Protocols | Browsers HTTP, HTTPS | Method URL, request line, info line, options |
| Media Protocols | iTunes, RealPlayer, Windows Media Player, Quick Time | File type, file size, file name, transfer time, user name, user ID |
| Internet Telephony | Voice over IP | Caller ID, Called ID |
| Remote Access | TELNET, secure TELNET, secure rlogin, rlogin, Terminal Services, Remote Desktop, PC anywhere | Server name(s), port ID(s), user name(s) or any combination |
| Instant Messenger | Yahoo IM, MSN IM, AOL IM, Google Chat, Chat | Time stamp(s), Messenger ID, screen names/user names of participants, buddy lists, file name(s) and size of file(s) transferred |
| Mail | MS-Exchange, Outlook Web access | Folders, operations |
| P2P | Kazaa, EDonkey, Gnutella, Shareza, Bittorent | File name(s), user(s), referrer name(s) |
| Network Management Protocols | DNS, DHCP, NIS, SNMP, HP OpenView, IBM Netview | User name(s), times, lease period(s) |
| Directory Server Protocols | LDAP | Server name(s), domain name(s) |

In the various embodiments of the present invention disclosed herein, the metadata listed in Table 1 are generated using deep packet analysis. Deep packet analysis is generally known and is not further disclosed to avoid over-complicating the herein disclosure. In accordance with one embodiment of the present invention, deep packet analysis is provided by monitor 4 when packet processing engine 32 is implemented using model ENP-2611 from Radisys Corporation. One of ordinary skill in the art would readily recognize that packet processing engine 32 may be implemented using other types and models of packet processing engines that provide deep packet analysis.

After receiving the generated session information 98, collector 6 associates session information 98 with at least one object attribute from an object maintained by the directory service. Associating the session information with at least one object attribute may be accomplished using the various embodiments taught in the Monitor Device Patent or in the Security Log Patent.

Associating Session Information Using the Disclosure in the Monitor Device Patent In accordance with one embodiment of the present invention, collector 6 associates session information, such as session information 98, with at least one object attribute by matching the client application network address included in the session information with at least one object attribute that has been associated with a network address obtained from an authentication packet. The Monitor Device Patent teaches various embodiments for associating a network address from an authentication packet with a set of object attributes. In accordance with one embodiment of the present invention, monitor 4 identifies authentication exchange packets from the packets received. For each authentication exchange packet identified, monitor 4 extracts a user ID and a network address from the authentication exchange packet and sends the user ID and network address to collector 6, which attempts to associate the user ID with user information maintained by the directory service. If collector 6 successfully associates the user ID and with user information maintained by the directory service, collector 6 creates an association between the network address extracted from the authentication packet and the user information. Collector 6 then records the association between the network address and the user information in a database.

For example, control software 94 obtains the user information in the form of user object attributes, which control software 94 obtains from directory service 14. Control software 94 stores these user object attributes in memory store 24 in a suitable form, such as in database table 120, shown in FIG. 4. Control software 94 associates an index to each set of object attributes that are defined in a single object. For example, if a set of object attributes pertain to a user object, an index is associated with the set of user object attributes, such as user name, group ID, and organizational unit ID. The term at "least one object attribute" or "set of user object attributes" is hereinafter also referred to as an "attribute set". Control software 94 assigns a unique index to each attribute set stored in table 120.

In addition, to enhance clarity, the examples below refer to user information and user object attributes. However, the scope and spirit of the various embodiments of the present invention disclosed herein are not intended to be limited to associating session information only to user object attributes but may include associating session information with object attributes other than user object attributes, such as computing device object attributes or object attributes that pertain to another type of network entity.

User information in the form of attribute sets 122-1 through 122-n are respectively associated with indices 124-1 through 124-n, where n represents the total number of attribute sets stored in database table 120. Attribute set 122-1 may include a user name attribute 126-1, a group ID attribute 128-1 and an organization unit ID attribute 130-1, while attribute set 122-n may include a user name attribute 126-n, group ID attribute 128-n and organizational unit attribute 130-n. Since each attribute set has a unique index and includes a selected number of user object attributes defined for a real user, the unique index can be used as a link to any combination of these user object attributes and in turn, to the real user defined by these user object attributes.

Control software 94 uses index 124-1 to link or associate packets 132-1 through 132-x in table 134 with attribute set 122-1 according to a selected criteria by storing index 124-1 with packets 132-1 through 132-x, in table 134, where x represents the total number of packets that have been selected according to a selected criteria. Similarly, for another attribute set, such as attribute set 122-n, control software 94 uses index 124-n, to link or associate packets 136-1 through 136-y in table 134 with attribute set 122-n according to a selected criteria by storing index 124-n with packets 136-1 through 136-y in table 134, where y represents the total number of packets that have been selected according to a selected criteria. A packet having a network address, such as a source or destination network address, that matches a destination network address from an authentication exchange response packet may be used as the selected criteria. However, matching the network address, whether a source or destination, of a packet to a destination network address obtained from an authentication exchange response packet is not intended to limit the various embodiments of the present invention disclosed herein. In another example, a packet having a network address, such as a source or destination network address, that matches a source network address from an authentication exchange request packet may be used as the selected criteria.

If the selected criteria includes using a destination network address extracted from an authentication exchange response packet, control software 94 instructs monitor 4, which is under program control by management software 30, to identify authentication exchange response packets from network traffic transmitted on a networked environment, such as networked environment 8. If the selected criteria includes using a source network address extracted from an authentication exchange request packet, control software 94 instructs monitor 4 to identify authentication exchange request packets instead. The network traffic may be in the form of packets, such as packets 36 in FIG. 1, received by monitor 4 from computer network 20 via an attachment point, such as backbone switch 22a.

In response to receiving the above request from control software 94, management software 30, will cause packet processing engine 32 to identify authentication exchange packets of the required type, such as a request or response type, and to assert the proper signals on the expansion bus of computing device 26 so that monitor 4 can receive the identified authentication exchange packets and forward them to collector 6 operating under program control of control software 94. Management software 30 and control software 94 communicate using the SOAP protocol although the use of this protocol is not intended to limit the scope and spirit of the various embodiments of the present invention described herein.

Monitor 4 identifies authentication exchange packets from packets 36 by inspecting each packet and determining whether the inspected packet includes content that would indicate that it is an authentication exchange packet. For example, monitor 4 identifies a packet as an authentication exchange packet if it has a data structure that complies with the data structure defined by ASN.1 for Kerberos authentication exchange packets. In another example, monitor 4 identifies a packet as an authentication exchange packet if it contains a port ID value 142 of "88".

Figure 5:
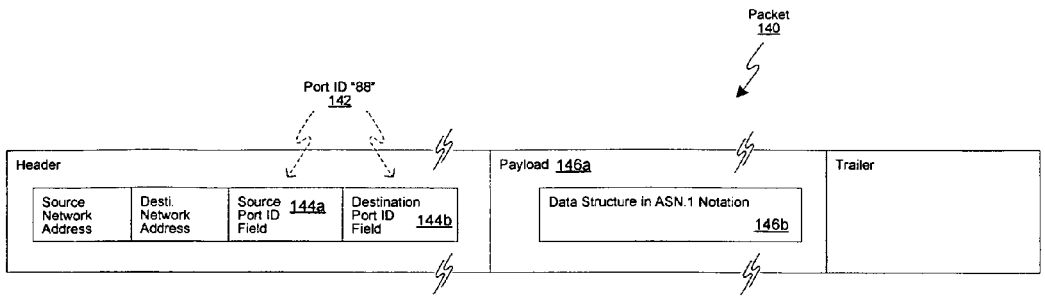
FIG. 5 is a block diagram of an example authentication network packet in accordance with another embodiment of the present invention.

As shown in FIG. 5, an authentication packet 140 typically includes a port ID value of "88", which is commonly used to designate the packet as a Kerberos authentication exchange packet when used as a source or destination port ID. Thus, if a port ID of "88" is used in source port ID field 144a or destination port ID 144b, it may indicate that the packet is possibly a Kerberos authentication exchange packet but the association between a packet having a source or destination port ID of "88" and an actual Kerberos authentication exchange packet is not absolute since port IDs may not be consistently used or applied in a networked environment. The term "Kerberos authentication exchange packet" includes packets commonly referred to as Kerberos authentication request packets or Kerberos authentication response packets.

In addition, payload 146a in a Kerberos authentication exchange packet contains data 146b that complies with the ASN.1 notation. In accordance with another embodiment of the present invention, monitor 4 identifies a Kerberos authentication exchange packet by decoding the ASN.1 formatted content in payload 146a, such as data 146b, to determine whether the content is a Kerberos authentication exchange packet. For example, if the ASN.1 notation used in payload 146a describes a data structure specific to that used in a Kerberos authentication exchange packet, then monitor 4 will designate that packet as a Kerberos authentication exchange packet. This data structure is defined in RFC Title 1510, September 1993, available from the Internet Engineering Task Force (IETF) of the Internet Society (ISOC) of Reston, Va. In addition to, or in lieu of, decoding the contents of data payload 146a, monitor 4 may identify Kerberos authentication exchange packets from other packets by designating packets having a source or destination port ID of "88" as Kerberos authentication exchange packets.

Authentication exchange packets on a networked environment, such as networked environment 8, are typically generated when an entity, such as device 16-1, requests credentials to obtain access to a network entity, such as directory service 14, on networked environment 8. For example, under the Kerberos protocol, such a request may be in the form of a real user, such as real user 18-1, engaging in a network log-on transaction using device 16-1 to enter a user name and password. During this log-on transaction, device 16-1 sends an authentication exchange request packet to an authentication service 25.

Authentication service 25 may be provided as a subset of services available from directory service 14 or as a separate software application on networked environment 8. For example, directory service 14 and authentication service 25 may be implemented by installing on server 10 the Microsoft® brand operation system, Windows 2003, which provides authentication and directory services through an integrated software application referred to as Active Directory. Active Directory is a LDAP-based directory service and like Windows 2003, is a product of Microsoft Corporation, of Redmond, Wash.

The authentication exchange request packet includes user information in the form of a user name, which is referred to as a principal name under the Kerberos protocol. Under the Kerberos Protocol, a third party authentication service, such as authentication service 25 in FIG. 1, functions as a trusted source from whom network entities on a networked environment, such as real users 18-1 through 18-n, respectively share a password, commonly referred to as a "secret-key". A network entity, such as real user 18-1, uses a secret-key to prove that she is who she claims to be. The authentication service 25 maintains these secret-keys for each network entity in a database according to a name defined for the network entity. The Kerberos protocol refers to each name as a "principal name". Each principal name is in the format consistent with the naming convention used by directory service 14, such as a real user's e-mail address used on networked environment 8. For example, the e-mail address may be in the form of a prefix before the "@" symbol and a suffix after the "@ symbol, where the prefix is unique to each real user on networked environment 8 and the suffix is the domain served by the directory service 14. If the network entity is a computing device and if directory service 14 is implemented using the Microsoft Active Directory product, the principal name is also in an email format, except the symbol "$" is placed at the end of the prefix and before the "@" symbol.

The Kerberos protocol also defines the method of exchanging the secret-key, which is sometimes referred to as an "authentication exchange" process. Under this process, an initiator, such as computing device used by real user 18-1 sends an authentication exchange request to the authentication service 25 seeking credentials to obtain access to a network entity, such as directory service 14, on networked environment 8. This request is made in the form of an authentication exchange request packet, which contains at least the initiator's principal name and the target network entity's principal name. Upon receipt, authentication service 25 checks whether the principal names received are valid by, among other things, determining whether the initiator's and target network entity's principal names are in the authentication service 25 database.

If the principal names are found valid, authentication service 25 responds with an authentication exchange response packet that contains the principal names previous sent, the initiator's network address and the credentials requested, including the current time, a lifetime value and a temporary encryption key, called a "session key". The authentication service 25 encrypts the contents of the authentication exchange response packet using the initiator's secret-key. After receiving the authentication exchange response packet, the initiator decrypts it by using the initiator's secret key, enabling the initiator to obtain the session key.

The session key can be used to decrypt messages that were encrypted using either the initiator's secret-key or the target network entity's secret-key. Thus, after obtaining the session key, the initiator can encrypt packets using the session key and then send the encrypted packets to the target network entity. Upon receipt, the target network entity can then decrypt the packets using the target network's secret-key, which it already possesses.

After identifying a packet as an authentication exchange packet, monitor 4 extracts the user ID and a network address contained in the authentication exchange packet, and sends them to collector 6 using the SOAP protocol. If the authentication exchange packet is a Kerberos authentication exchange packet, the extracted user ID is in the form of a Kerberos principal name. In this example, authentication exchange packets identified are of the authentication exchange response packet type and thus the type of network address extracted by monitor 4 is a destination network address. In another example, monitor 4 may instead be configured to identify an authentication exchange request packet, and if so, monitor 4 will extract a source network address from the authentication exchange request packet.

Upon receiving the extracted user ID and the network address, which in this example is a destination network address, control software 94 validates the user ID and network address. Validation may include determining whether the user ID includes a user name that matches a user name attribute in one of the user objects previously stored in memory store 24. If so, control software 94 validates the network address by determining whether real user 18-1 is logged on to a client that was used to initiate the authentication exchange.

Determining whether real user 18-1 is logged onto the client that was used to initiate the authentication exchange may be accomplished by including program code in control software 94 that can request the hostname of the client from a name service, such as name service 27, that is available on a networked environment. In the request, control software 94 includes the extracted network address. Name service 27 responds by performing a reverse look-up, and if a hostname exists that has been assigned the same network address as that of the extracted network address, name service 27 will reply with that hostname.

Name service 27 maps the names of network resources and entities, such as device 16-1 through 16-n, to their respective network addresses, referred to as IP addresses in a networked environment that uses the TCP/IP protocol suite. Mapping devices with their respective network addresses, permits name service 27 to return the name of the device upon receiving the device's network address or vice versa. For example, if device 16-1 having the device name of "jdoe–dtop" is designated with an IP address of 192.1.0.100, name service 27 will return the name "jdoe_dtop" if it receives an IP address of 192.1.0.100. In the reverse, if the name service receives the device name "jdoe_dtop", it will perform a reverse lookup and return the IP address of the device having hostname "jdoe_dtop", which in this example is 192.1.0.100. Name services are commonly known and are available from a variety of vendors. One of ordinary skill in the art would readily recognize without undue experimentation after receiving the benefit of this disclosure that alternative name services may be employed. For example, a server providing DNS (Domain Name System) services may be accessed or used to provide a name service. In addition, WINS (Windows Internet Name service), or other name services may be used. DNS and WINS are commonly known.

After receiving the hostname from name service 27, control software 94 sends a user account query, or equivalent, to the client having the hostname sent by the name service. If the client responds by indicating that a user account associated with real user 18-1 is currently logged onto the client, then control software 94 associates the unique index assigned to the user information, such as index 124-1 in FIG. 4, to packets having a network address that matches the network address extracted from the authentication exchange packet. Monitor 4 receives these packets from attachment point, such as backbone switch 22a, which obtains the packets from computer network 20. Thus, packets associated with real user 18-1 can be used to determine the type and amount of network traffic that originates from real user 18-1 or from a client, which in this example is device 16-1, with the extracted network address.

For example, referring again to FIG. 4, if an extracted network address is in the form of an IP address of "192.168.0.101", monitor 4 will attempt to identify packets having a source or destination network address equivalent to the extracted network address, which in this example is "192.168.0.101", from packets received from switch 22a. Packets having a source network address of "192.168.1.101 are shown in table 134 as packets 132-1 through 132-x, where x represents the number of packets identified by monitor 4 to have a source network address that is the same as the extracted network address. Monitor 4 sends packets 132-1 through 132-x, to collector 6 for storage in table 134. Collector 6 associates each packet with the same unique index, such as index 124-1, that was previously associated with the user information, which in this example is attribute set 122-1, matched to the authentication exchange packet.

In accordance with another embodiment of the present invention, collector 6 stores packets 132-1 through 132-x in a different form by limiting the amount of packet information stored, such as by storing only metadata, if any, generated for the packets. For example, if packets 132-1 through 132-x where generated as part of an FTP transfer, collector 6 generates metadata from the packets by extracting the name(s) and type(s) of any file subject to the FTP transfer. Collector 6 stores the generated metadata with the packets instead of the entire content of packets 132-1 through 132-x.

Similarly, if another extracted network address is in the form of an IP address of "192.168.0.120", monitor 4 will attempt to identify packets having a source or destination network address of "192.168.0.120" from packets received from switch 22a. Packets having a source network address of "192.168.1.120 are shown in FIG. 4 as packets 136-1 through 136-y, where y represents the number of packets identified by monitor 4 to have a source network address that is the same as the extracted network address. Monitor 4 sends packets 136-1 through 136-y, to collector 6 for storage in table 134 with each packet associated with the same unique index, such as index 124-n, that was previously associated with the user information matched to the authentication exchange packet, which in this example is attribute set 122-n.

Once the packets are associated with an attribute set, such as attribute set 122-1, any attribute saved in table 120 that corresponds with attribute set 122-1 can now be used to search for these packets. In essence, the attributes stored with attribute set 122-1 are associated or linked with packets 132-1 through 132-x, including their respective packet contents, such as network addresses. The alternative is also true. A particular packet or set of packets and their content, such as network addresses, stored in table 134 can be used to search for a particular attribute.

Collector 6 associates session information with an attribute set in table 120 by matching a client network address from the session information with a network address from a packet associated with an attribute set. For example, collector 6 stores session information 98 in table 138 and attempts to match a client network address from session information 98 with a packet in table 134 that has a network address, whether source or destination, equivalent to the client network address. If collector 6 finds such a match, it includes the index associated with the packet, such as index 124-1, with session information 98 in table 138. Since index 124 is also associated with attribute set 122-1, session information 98 is also linked or associated with attribute set 122-1.

Associating Session Information Using the Disclosure in the Security Log Patent

In accordance with another embodiment of the present invention, collector 6 associates session information, such as session information 98, with at least one object attribute by matching the client network address included in session information 98 with at least one object attribute that has been associated with a network address obtained from a security event log, such as event log 148 in FIG. 1. The Security Log Patent teaches various embodiments for associating a network address obtained from a security event log with at least one object attribute.

Collector 6 through control software 94 obtains event log 148 from authentication service 25 on networked environment 8. Besides authenticating network entities seeking to use networked environment 8 as discussed above, authentication service 25 maintains event log 148 by logging information, herein after referred to as "log entries", pertaining to network authentication-related activities that occur, such as user logon and logoff events, on network environment 8. Authentication service 25 stores these log entries, such as log entries 150-1 through 150-n, event log 148. For each log entry, such as log entry 150-1, authentication service 25 may include the identity 152 of a network entity, such as a user name 154a or hostname 154b, used by the network entity that triggered the network authentication-related event; a network address 156 assigned to the network entity; and a time stamp 158 reflecting the time in which the event occurred.

Obtaining event log 148 enables control software 94 to extract at least one category item that can be used for associating packets from network traffic traversing on networked environment 8. For example, control software 94 may extract a user name and a network address from event log 148. Control software 94 may also obtain a time stamp, such as time stamp 158, associated with the user name and network address. The user name, network address and time stamp extracted from the same log entry are hereinafter referred to as an "extracted user name", "log extracted network address", and "extracted time stamp", respectively.

The manner of extracting at least one category item from event log 148 depends on the type of application program used to create and maintain event log 148. For example, if authentication service 25 is implemented using a Microsoft brand operating system, such as Microsoft Windows Server 2003, that provides the Active Directory software application, then control software 94 includes program code that uses the SMB protocol to obtain event log 148 from authentication service 25. SMB, which is an acronym for Server Message Block, protocol is commonly known and a network protocol that supports the sharing of data, files, resources and permits authenticated inter-process communication between computing devices that use a Microsoft Windows-based operating system in a networked environment. For example, SAMBA includes an open source implementation of the SMB protocol and thus, may be used to retrieve security event logs from a directory service implemented using Microsoft Active Directory.

The use of Active Directory to implement authentication service is not intended to be limiting in any way. Other types of authentication services may be used, such as eDirectory, available from Novel. The eDirectory software application is intended for use with Linux-based operating systems and can be used to provide an authentication service that creates and maintains an event log that event information substantially similar to those logged in event log 148. If event log 148 is created and managed using eDirectory or a similar Linux-based software application, then control software 94 includes program code that uses the syslog protocol, which is commonly known, to extract event items from the event log maintained by the authentication service provided under eDirectory.

In another alternate embodiment, a software agent (not shown) may be deployed on server 10 and used to provide event log 148 to control software 94. This software agent uses the appropriate protocol supported by the type of authentication service and event log used to log event information on networked environment 8 and by control software 94, including the SMB or syslog protocol.

After obtaining at least one category item, such as an extracted user name, and a log extracted network address, and in accordance with a further embodiment of the present invention, control software 94 also obtains additional category items related to the extracted user name by using the LDAP protocol to communicate with directory service 14. These additional category items include a group id attribute and organizational id attribute from a user object having a user name attribute that matches the extracted user name, such as user name 154. Using the LDAP protocol is not intended to limit the scope and spirit of the various embodiments of the present invention disclosed herein. Other protocols may be used as long as the protocol selected is compatible with the type of directory service and authentication service implemented on networked environment 8.

Further, control software 94 may obtain more than one set of category items, providing system 2 with more than one set of category items that may be used to associate network packets. The term "set of category items" is hereinafter also referred to as a "category set". Each category set includes at least a user name category item for storing an extracted user name, a log extracted network address obtained from the same log entry as the extracted user name, a group id category item for storing a group id attribute, an organizational unit category item for storing an organizational unit attribute, and if applicable, a time stamp category item for storing a time stamp, if the time stamp was previously extracted with the extracted user name stored in the same category set. The group id and organizational unit attributes stored in a category set are obtained from a user object having a user name attribute that matches the extracted user name stored in the category set. Control software 94 also associates a unique index to each category set.

Figure 6:
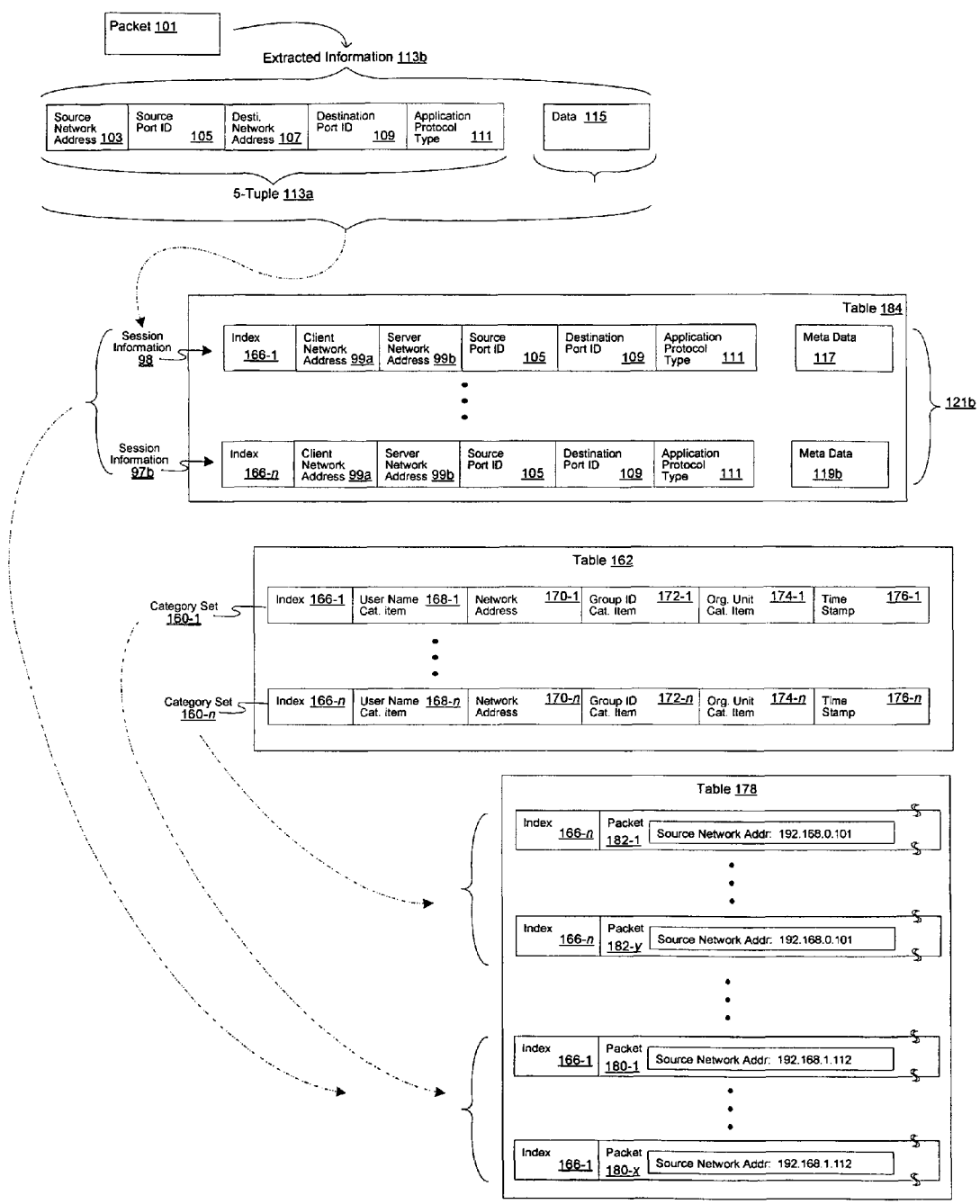
FIG. 6 is a block diagram of example tables for associating session information with an object attribute(s) in accordance with yet another embodiment of the present invention.

For example, referring to FIG. 1 and FIG. 6, control software 94 stores each category set, such as category sets 160-1 through 160-n, in memory store 24 in a suitable form, such as in a table 162 defined in a database or equivalent; and respectively associates indices 166-1 through 166-n with category sets 160-1 through 160-n, where n represents the total number of category sets stored in table 162. Control software 94 uses the SOAP protocol and an appropriate database abstraction layer necessary to communicate with the type of database selected, such as Torque or JDBC, which are commonly known.

Category set 160-1 includes a user name category item 168-1; a network address 170-1, a group id category item 172-1; an organizational unit category item 174-1; and if applicable, a time stamp category item 176-1. Similarly, category set 160-n may include a user name category item 168-n, a network address 170-n, a group id category item 172-n, an organizational unit category item 174-n; and if applicable, a time stamp category item 176-n, where n represents the total number of category sets stored in table 162.

Control software 94 also obtains network traffic traversing on network environment 8, by instructing monitor 4, which is under program control of management software 30, to receive packets, such as packets 36 in FIG. 1, from networked environment 8 and to forward these packets to collector 6. Monitor 4 receives packets 36 from an attachment point, such as backbone switch 22a. In response to receiving the above request from control software 94, management software 30 will cause packet processing engine 32 to assert the proper signals on the expansion bus of computing device 26 so that monitor 4 can receive the packets and forward them to collector 6 operating under program control of control software 94. Management software 30 and control software 94 communicate using the SOAP protocol although the use of this protocol is not intended to limit the scope and spirit of the various embodiments of the present invention.

Upon receiving packets 36 from monitor 4, control software 94 stores the packets in a table 178 and identifies packets having a network address that matches a log extracted network address stored in a category set in table 162. For each packet that is identified to have a matching network address, control software 94 associates a unique index, such as index 166-1, which was previously assigned to a category set having a log extracted network address, to packets that have a network address matching the log extracted network address. Since each category set has a unique index and includes a category set related to the identity of a network entity, such as the user name of a real user, network traffic generated by the network entity can be monitored because packets comprising that network traffic can be associated with the user name of that network entity using tables 162 and 178.

For example, packets received from monitor 4 may include packets having a source network address of 192.168.1.112, such as packets 180-1 through 180-x stored in Table 178, where x represents the number of packets having a source network address of 192.168.1.112. The type of network address held by a packet is not intended to limit the invention in any way. A source network address or destination network address may be used to match packets with a category set. In this example, if category set 160-1 includes a log extracted network address of 192.168.1.112. Control software 94 also applies index 166-1 to packets 180-1 through 180-x, creating an association between category set 160-1 and packets 180-1 through 180-x in table 178.

In another example, the packets received from monitor 4 may also include packets having a source network address of 192.168.0.101, such as packets 182-1 through 182-y, where y represents the number of packets having a source network address of 192.168.0.101. The type of network address held by a packet is not intended to limit the invention in any way. A source network address, destination network address or both may be used to match packets with a category sets. In this example, if category set 160-n includes a log extracted network address of 192.168.0.101, control software 94 applies index 166-n to packets 182-1 through 182-y, creating an association between category set 160-n and packets 182-1 through 182-y. By providing an association between or among packets traversing on a networked environment and selected user information, such as user name, group id, organizational unit or any combination of these, an administrator of system 2 can monitor the network traffic generated by a real user that corresponds to the selected user information or category.

If extracted time stamps are included in the category sets stored in table 162, control software 94 may also require any packets identified to have a network address matching a log extracted network address stored in one of the category sets to also have a time stamp that is equal or a later than the extracted time stamp stored in the category set with the matching extracted network address.

Once the packets are associated with a category set, such as category set 160-1, any attribute saved in table 162 that corresponds with category set 160-1 can now be used to search for these packets. In essence, the attributes stored with category set 160-1 are associated or linked with packets 180-1 through 180-x, including their respective packet contents, such as network addresses. The alternative is also true. A particular packet or set of packets and their content, such as network addresses, stored in table 178 can be used to search for a particular attribute.

Collector 6 associates session information with a category set in table 162 by matching a client network address from the session information with a network address from a packet associated with a category set. For example, collector 6 stores session information 98 in table 184 and attempts to match client network address 99a from session information 98 with a packet in table 178 that has a network address, whether source or destination, equivalent to the client network address. If collector 6 finds such a match, it includes the index associated with the packet, such as index 166-1, with session information 98 in table 184. Since index 166-1 is also associated with category set 160-1, session information 98 is also linked or associated with category set 160-1. In turn, since category set 160-1 includes object attributes, such as user name 168-1, group ID 172-1 and organizational unit 174-1, session information is also linked or associated with these object attributes.

After collector 6 associates session information 98 with at least one object attribute, whether from an attribute set or a category set, by using the various embodiments disclosed in either the Monitor Device Patent or the Security Log Patent, collector 6 may also create a flow record by associating session information 98 in memory store 24 with at least one other previously generated session information, if any, that has a quintuple that matches the quintuple from session information 98. For example, in FIG. 4, session information 98 may be associated with session information 97a if session information 97a has the same client network address, client application port ID, server network address, server application port ID and transport protocol type as session information 98. In another example, in FIG. 6, session information 98 may be associated with session information 97b if session information 97b has the same client network address, client application port ID, server network address, server application port ID and transport protocol type as session information 98. Session information 97a and 97b may also include metadata 119a and 119b but may not be equivalent to metadata 117. Two or more session information that have the same client same client network address, client application port ID, server network address, server application port ID and transport protocol are named a "flow record", such as flow record 121a in FIG. 4 and flow record 121b in FIG. 6.

After associating session information with at least one object attribute, collector 6 reviews a security policy defined for the network environment by reviewing the session information and the object attribute(s) to determine whether the packet violates the security policy. Depending on the result of the security review, collector 6 reports the status of the security review and causes monitor 4 to either drop the packet or return the packet to the networked environment or any combination of the foregoing.

The security policy may include a set of security criteria defined for at least network entity defined in network environment 8, such as a user who has a user object defined for the user in directory service 14 and a set of actions that should be taken if it is found that a packet violates the security policy. The security criteria may include elements that may be compared with the session information stored in table 138 or 184 of FIG. 4 or 6, respectively, as well as information kept in the attribute sets listed in table 120 of FIG. 4 or the category sets listed in table 162 of FIG. 6. For example, these elements may include a source address; a destination address; an application program type, such as Instant Messenger, FTP and the like; a file type, such as jpeg, avi, mpeg and the like; a network entity ID, such as a user name or device name; a group ID; and an organizational unit. Collector 6 will compare the selected elements with the session information generated and the attribute set associated with the session information with the security criteria selected and if they match, collector 6 will enforce the security policy according to the set of actions defined in the security policy. The set of actions in the security policy may include to reporting, dropping or both the packet from which the session information was generated.

Collector 6, as seen in FIG. 1, may also be configured to include a HTTP software application that provides a HTTP service 190. Control software 94 uses HTTP service 190 to present an interface for a network administrator or equivalent person, to configure security policy by selecting the elements for the security criteria and set of actions on a computing device, such as device 16-n, on networked environment 8 having a HTTP-compatible browser 192, such as Mozilla Firefox or Internet Explorer. HTTP services and http-compatible browsers are commonly known.

Figure 7:
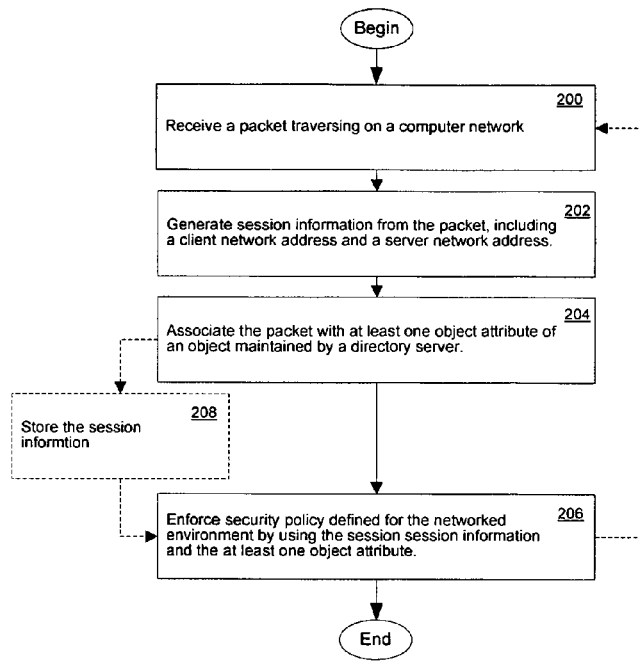
FIG. 7 is a block diagram flow for providing security on a networked environment is shown in accordance with another embodiment of the present invention.

Referring now to FIG. 7, a method for providing security on a networked environment is shown in accordance with another embodiment of the present invention. It is contemplated that the method includes using a system, such as system 2, on a networked environment having a directory service, such as networked environment 8 having computer network 20 and directory service 14, respectively, as described and shown in FIG. 1 above.

At least one a packet traversing on the computer network is received 200. The packet may be sent, for example, by a client application, such as client application 62a, to a server application, such as server application 64a, during an application session conducted between the client and said server applications.

Session information is generated 202 from each packet with the session information including a client network address and a server network address.

The packet is associated 204 with at least one object attribute of an object maintained by the directory service.

A security policy defined for the network environment is enforced 206 by using the session information and the object attribute(s) to determine whether the packet violates the security policy.

The method shown in FIG. 7 may be modified to include storing 208 the session information and/or receiving additional packets from the computer network instead of ending. Thus, after the packet is associated 204 with at least one object attribute, the session information is stored in memory before the security policy is enforced 206. After the security policy is enforced 206, the method flow returns to receiving 200 another packet instead of ending.

Figure 8:
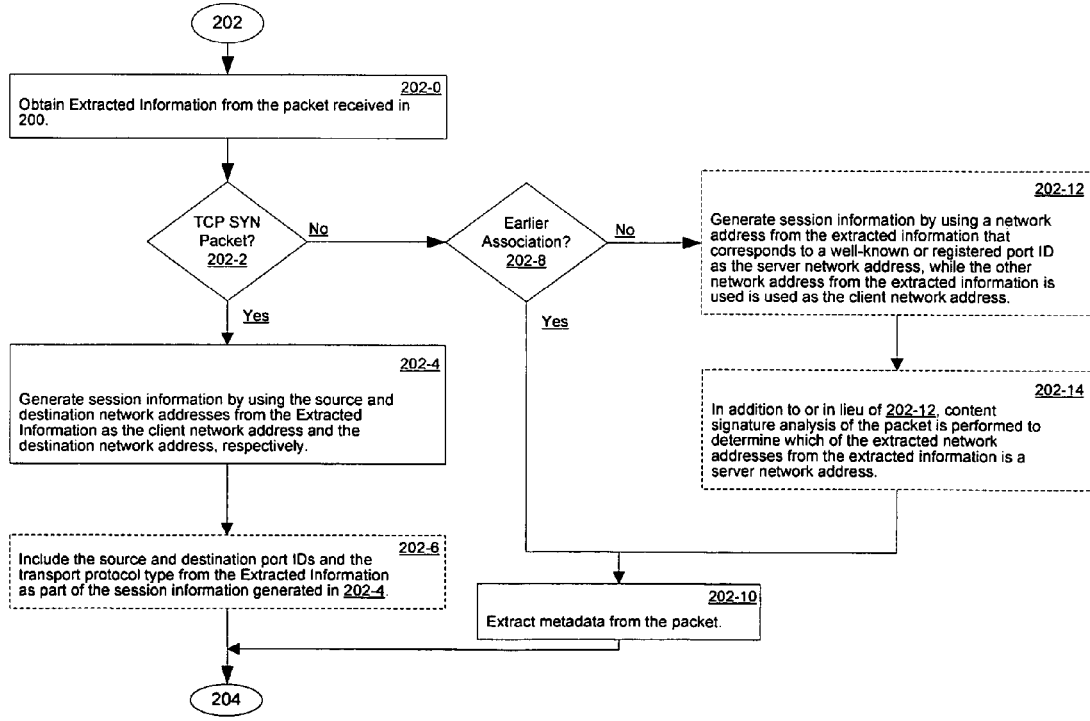
FIG. 8 is high level bock diagram flow of a process for generating session information in accordance with another embodiment of the present invention.

FIG. 8 is high level bock diagram flow of a process for generating session information in accordance with another embodiment of the present invention.

Extracted information is obtained 202-0 from the packet received in 200, and the packet is analyzed 202-2 to determine whether it is a SYN packet.

If the packet is found to be a TCP SYN packet, session information is generated 202-4 by using the source and destination network addresses from the extracted information as the client network address and the destination network address of the packet, respectively.

In accordance with another embodiment of the present invention, additional session information may be generated 202-6 by using the source and destination port IDs and the transport protocol type from the extracted information, enhancing the accuracy of the method shown in FIG. 7. The source and destination port IDs and the transport protocol type from the extracted information are included as part of the session information generated in 202-4.

If at 202-2 the packet is not a TCP SYN packet, it is determined 202-8 whether the packet received at 200 has been previously associated with an object maintained by the directory service. If so, metadata is extracted 202-10 from the packet, and after extraction, the method flow returns to 204.

If the packet received at 200 has not been previously associated with an object maintained by the directory service, the port IDs from the extracted information are analyzed to obtain 202-12 the respective network addresses of the client and server applications conducting the application session from which the packet originated. The network address corresponding to a port ID that is a well-known or registered port ID is used as the server network address, while the other network address from the extracted information is used as the client network address. For example, if the source port ID is a value corresponding to a well-known or registered port ID, the source network address of the packet is used as the server network address, while the destination network address is used as the client network address. Similarly, if the destination port ID is a value corresponding to a well-known or registered port ID, the destination network address of the packet is used as the server network address, while the source network address is used as the client network address.

In accordance with yet another embodiment of the present invention, in addition to or in lieu of using a port ID value to identify which of the network addresses from the extracted information should be used as a server address, content signature analysis of the received packet is performed 202-14 by analyzing the contents of the packet to determine whether it matches a known protocol encoding associated with certain application program types, such as those listed in Table 1, above. Protocol encoding used for various application program types are known in the art and thus, is not further discussed herein to avoid over-complication the herein disclosure. If a match is made, the source network address from the extracted information is identified as the server network address and the destination network address from the extracted information is identified as the client network address. If a match is not made, the source network address from the extracted information is identified as the client network address and the destination network address from the extracted information is identified as the server network address. The server and client network addresses are then included as part of the session information that is sent to collector 6.

After obtaining the network addresses of the client and server applications, the method flow proceeds to 202-10.

Figure 9:
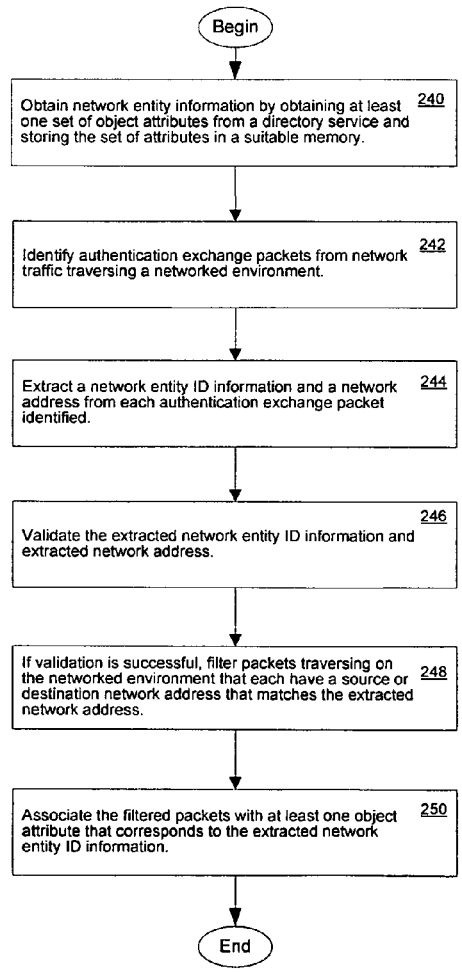
FIG. 9 is a block diagram flow of an example method for associating packets according to a selected category, such as user name, group ID, or organizational unit is shown in accordance with another embodiment of the present invention.

Referring now to FIG. 9, a method for associating packets according to a selected category, such as user name, group ID or organizational unit is shown in accordance with another embodiment of the present invention.

It is contemplated that the method includes using a system, such as system 2, on a networked environment having a directory service, such as networked environment 8 and directory service 14, respectively, as described above and shown in FIG. 1. Reliance on event log 148 is not required in this particular embodiment of the present invention.

User information is obtained 240 by obtaining at least one set of user object attributes from a directory service and storing the attributes selected in a suitable memory or database. It is contemplated that each set of user object attributes stored, such as user name, group ID and organizational unit attributes, corresponds to a real user for whom a user object has been created in the directory service. Those of ordinary skill in the art would readily recognize after receiving the benefit of this disclosure that the various embodiments of the present invention disclosed herein can also applied to other types of objects besides user objects, including printers, computing devices, such as personal computers and personal digital assistants (PDAs). For example, each set of object attributes obtained and stored, may include object attributes pertaining to the names, group ids and organizational units of network entities that include services or computing devices.

Authentication exchange packets are identified 242 from network traffic traversing on the networked environment.

A user ID and a network address are extracted 244 from each authentication exchange packet identified. The user ID is in the form of a Kerberos principal name if the authentication exchange packet identified complies with the Kerberos authentication protocol.

In one variation of the embodiment of the present invention shown in FIG. 5, the type of network address extracted is a destination network address if the type of authentication exchange packet selected for identification 242 is an authentication exchange response packet. In another variation, the type of network address extracted is a source network address if the type of authentication exchange selected for identification 242 is an authentication exchange request packet.

The user ID and the extracted network address are validated 246. Validation of the extracted user ID may be accomplished by, for example, determining whether the extracted user ID includes a user name that matches a user name attribute from one of the set of user object attributes previously stored in memory store 24 (shown in FIG. 1). If a match is found, the extracted user ID is deemed successfully validated.

Validation of the extracted network address may be accomplished by determining whether a real user is logged on to the client that initiated the authentication exchange. In one embodiment of the present invention, this may be accomplished by using the extracted network address in a hostname request that is sent to a name service 27 (shown in FIG. 1) on the networked environment. Upon receiving the hostname request, name service 27 will perform a reverse look-up. If a hostname exists that has been assigned to a client having the same network address as the extracted network address, the name service will reply with that hostname. If the hostname is returned, control software 94 sends a user account query to the client having the hostname. The client having the hostname responds to the user account query by returning a list of user accounts currently logged onto the client at the time the user account query is received. Control software 94 reviews the list of user accounts and if it finds, a user account having a user name matching the extracted user ID, which in this example is a user name, control software 94 deems valid the extracted network address.

If the extracted user ID and extracted network address are successfully validated, network traffic traversing on the networked environment are filtered 248 for packets having a network address, which may be a source network address or destination network address, matching the extracted network address. These filtered packets, if found, are then associated 250 with at least one of the object attributes stored in memory store 24 that corresponds to the extracted user ID. This association may be accomplished by assigning a unique index to the identified packets and the set of user object attributes having the user name attribute that matched the extracted user ID and if desired, by storing the identified packets in a suitable memory store for later retrieval, analysis or both. By providing this type of association between or among packets traversing on a networked environment and selected user information, such as user name, group ID, organizational unit or any combination of these attributes, one can monitor the network traffic generated by a real user that corresponds to the selected user information.

In addition, in accordance with yet another embodiment of the present invention, filtering 248 for packets having a network address matching the extracted network address may be performed without validating 246 the extracted user ID and extracted network address.

The actions or steps disclosed in FIGS. 7-13 are not intended to be limited to the order listed but may be implemented in any order sufficient to successfully perform the method. In addition, one of ordinary skill in the art would readily recognize after receiving the benefit of the herein disclosure that more than one attribute sets may be used.

Figure 10:
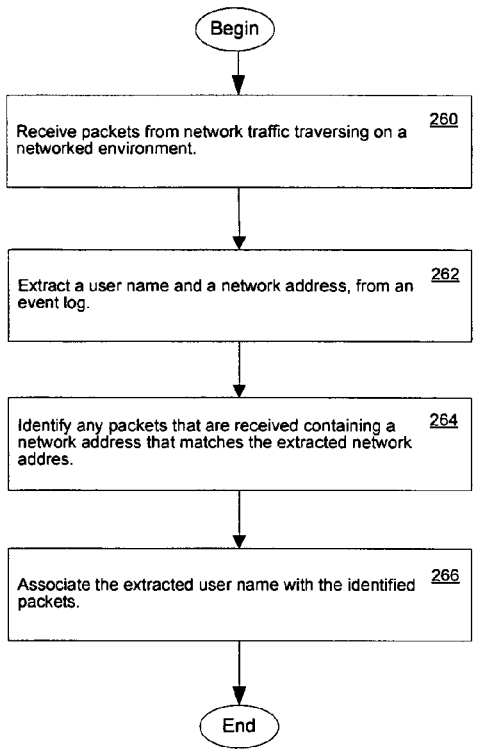
FIG. 10 is a block diagram flow of an example method for associating certain packets according to a selected category by using event log information in accordance with yet another embodiment of the present invention.

In conjunction with FIG. 1, FIG. 10 discloses a method for associating network packets according to a selected category, such as information related to network entity identity, including a user name, group id attribute, organization unit attribute, or other category used or defined in a networked environment, by using event log information maintained on the networked environment in accordance with another embodiment of the present invention.

It is contemplated that the method includes using a system, such as system 2, on a networked environment having an authentication service and a directory service, such as networked environment 8, authentication service 25 and directory service 14, respectively.

Packets from network traffic traversing on the networked environment are received 260, such as packets 36, from backbone switch 22a.

A user name and a network address are extracted 262 from an event log, such as event log 148. The event log may be obtained from an authentication service, such as authentication service 25. Extracting 262 a user name and network address from an event log may also include obtaining (not shown) additional log data associated with the extracted user name and network address, such as a time stamp.

Any packet received containing a network address that matches the log extracted network address is identified 264. Identifying 264 a packet may also include requiring that any identified packet also contain a time stamp that is equal or a later than the extracted time stamp, if the extracted time stamp was previously extracted.

The extracted user name is associated 266 with the identified packets. This association may be accomplished by assigning a unique index to the identified packets and the extracted user name and if desired, by storing the unique index, extracted user name and the identified packets in a suitable memory store or database for later retrieval, analysis or both.

Figure 11:
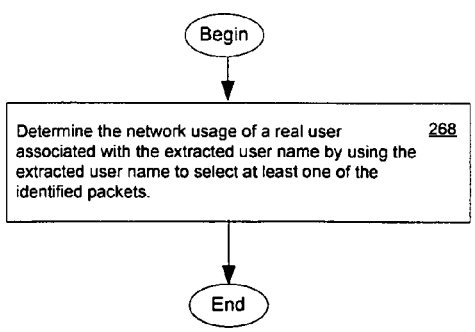
FIG. 11 is a block diagram flow for improving the example method shown in FIG. 5 in accordance with yet another further embodiment of the present invention.

As shown in FIG. 11, the embodiment of the present invention shown in FIG. 10 may be further improved if the network usage of a real user associated with the extracted user name is determined 268 by using the extracted user name to select at least one of the identified packets.

Figure 12:
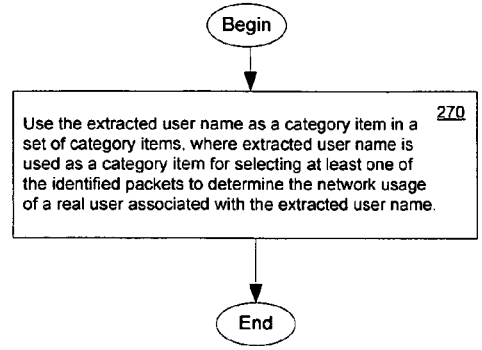
FIG. 12 is a block diagram flow for improving the example method shown in FIG. 5 in accordance with further still another embodiment of the present invention.

As shown in FIG. 12, the embodiment of the present invention shown in FIG. 10 may further be improved if the extracted user name is used 270 as a category item in a set of category items, where the extracted user name is used as a category item for selecting at least one of the identified packets to determine the network usage of a real user associated with the extracted user name.

Figure 13:
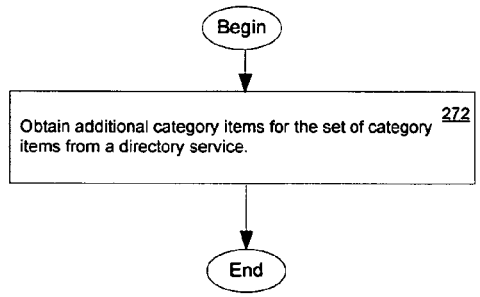
FIG. 13 is a block diagram flow for improving the example method shown in FIG. 7 in accordance with yet another embodiment of the present invention.

As shown in FIG. 13, the embodiment of the present invention shown in FIG. 10 may be further improved if additional category items for the set of category items are obtained 272 from a directory service, such as directory service 14, provided on the networked environment. These additional category items may include a group ID attribute and an organizational unit attribute, which are obtained from a user object having a user name attribute matching the extracted user.

The actions or steps disclosed in FIGS. 7-13 are not intended to be limited to the order listed but may be implemented in any order sufficient to successfully perform the method. In addition, one of ordinary skill in the art would readily recognize after receiving the benefit of the herein disclosure that more than one set of event items and category items may be used.

While the present invention has been described in particular embodiments, it should be appreciated that the present invention should not be construed as limited by such embodiments. Rather, the present invention should be construed according to the claims below.

We claim:

1. A computer implemented method comprising:
   identifying an authentication exchange packet from network traffic traversing on a computer network;
   extracting a user ID and a client network address from the authentication exchange packet;
   selecting, from a directory service, a network entity having an attribute associated with the user ID;
   associating the attribute with the client network address;
   by a computing device, receiving an additional packet traversing on the computer network, the additional packet transmitted as part of an application session established between a client application and a server application;
   generating session information from the additional packet, the session information comprising a client network address and a server network address;
   associating the additional packet with the network entity using the session information; and
   enforcing a security policy defined for the computer network by using the session information and attribute to determine whether the additional packet violates the security policy.

2. The method of claim 1, wherein generating session information includes extracting a source network address, a source port ID, a destination network address, a destination port ID, and a transport protocol type from the additional packet.

3. The method of claim 1, wherein generating session information further includes:
   extracting a source network address and a destination network address from the additional packet; and
   using the source network address as the server network address and the destination network address as the client network address if the source port ID is equivalent to a well-known or registered port ID and the additional packet is not a TCP SYN packet.

4. The method of claim 1, wherein generating session information further includes:
   extracting a source network address and a destination network address from the additional packet; and using the destination network address as the server network address and the source network address as the client network address if the destination port ID is equivalent to a well-known or registered port ID and the additional packet is not a TCP SYN packet.

5. The method of claim 1, wherein generating session information further includes:
extracting a source network address and a destination network address from the additional packet; and
using the source network address as the client network address and the destination network address as the server network address if the additional packet is a SYN packet.

6. The method of claim 1, wherein generating session information includes:
extracting a transport protocol type from the additional packet; and
determining an application program type for the application session.

7. The method of claim 6, wherein determining an application program type includes:
extracting a source network address from the additional packet;
determining whether the additional packet is a SYN packet, if the transport protocol type is TCP; and
extracting a port ID from the additional packet if the port ID is equivalent to a well-known or registered port ID, and using the port ID to select an application program type based on well known or registered port numbers, if the transport protocol type is TCP and the additional packet is not a SYN packet.

8. The method of claim 6, wherein determining an application program type includes:
extracting a source network address; and
extracting a port ID from the additional packet if the port ID is equivalent to a well-known or registered port ID, and using the port ID to select an application program type based on well known or registered port numbers if the transport protocol type is UDP.

9. The method of claim 6, wherein generating session information further includes generating metadata from the additional packet.

10. The method of claim 9, wherein the metadata includes data specific to the application session.

11. The method of claim 9, wherein the application session is within a particular application program category and the metadata includes characteristics particular to the application program category.

12. The method of claim 9, wherein the metadata information includes a file name of any data transferred by the additional packet from the application protocol session and a type for the data.

13. The method of claim 9, wherein the metadata includes an Instant Messenger ID.

14. The method of claim 1, wherein the attribute is a name attribute, a group ID attribute, or an organizational ID attribute.

15. The method of claim 1, further including verifying the client network address by determining whether the network entity is logged onto a computing device assigned with the client network address on the computing network.

16. The method of claim 1, wherein using the session information and the network entity to determine whether the additional packet violates the security policy includes using a name attribute, group ID attribute or organizational ID attribute obtained from the network entity.

17. The method of claim 1, wherein enforcing a security policy includes dropping the additional packet if the additional packet violates the security network policy.

18. The method of claim 17, wherein the additional packet violates the security policy if the session information includes a particular application protocol session type.

19. The method of claim 1, wherein enforcing the security policy includes reporting the application session.

20. The method of claim 1, wherein the additional packet violates the security policy if the session information includes a particular type of metadata.

21. The method of claim 1, wherein the additional packet violates the security policy if the session information includes metadata that matches particular data content.

22. The method of claim 1, wherein the additional packet violates the security policy if the session information includes a selected source address.

23. The method of claim 1, wherein the additional packet violates the security policy if the session information includes a selected destination address.

24. An apparatus comprising:
a memory;
a means for identifying an authentication exchange packet from network traffic traversing on a computer network;
a means for extracting a user ID and a client network address from the authentication exchange packet;
a means for selecting, from a directory service, a network entity having an attribute associated with the user ID;
a means for associating the attribute with the client network address;
a means for receiving an additional packet traversing on the computer network, the additional packet having a source network address, a source port ID, a destination network address, a destination port ID, and a transport protocol type, the additional packet transmitted as part of an application session established between a client application and a server application;
a means for generating session information from the additional packet, the session information comprising a client network address and a server network address;
a means for associating the additional packet with the network entity using the session information; and
a means for enforcing a security policy defined for the computer network by using the session information and the attribute to determine whether the additional packet violates the security policy.

25. The apparatus of claim 24, wherein the session information includes the client network address, the source port ID, the server network address and the destination port ID, and the application protocol type.

26. The apparatus of claim 25, wherein the means for generating session information selects the source network address as the server network address and the client network address as the destination network address if the source port ID is equivalent to a well-known or registered port ID and the additional packet is not a TCP SYN packet.

27. The apparatus of claim 25, wherein the means for generating session information selects the destination network address as the server network address and the source network address as the client network address if the destination port ID is equivalent to a well-known or registered port ID and the additional packet is not a TCP SYN packet.

28. The apparatus of claim 25, wherein the means for generating session information selects the source network address as the client network address and the destination network address as the server network address if the additional packet is a SYN packet.

29. The apparatus of claim 24, wherein the means for generating session information generates metadata from data within a data field of the additional packet if the data is found in the data field.

30. The apparatus of claim 29, wherein the metadata includes data specific to the application session.

31. The apparatus of claim 29, wherein the application session is within a particular application program category and the metadata includes characteristics particular to the application program category.

32. The apparatus of claim 29, wherein the metadata information includes a file name of any data transferred by the additional packet from the application protocol session and a type for the data.

33. The apparatus of claim 29, wherein the metadata information includes data transferred by the additional packet from the application protocol session, a type for the data and an Instant Messenger ID.

34. The apparatus of claim 24, wherein the attribute is a name attribute, a group ID attribute, or an organizational ID attribute.

35. The apparatus of claim 24, further including a means for verifying the client network address by determining whether the network entity is logged onto a computing device assigned with the client network address on the computer network.

36. The apparatus of claim 24, wherein the attribute is a name attribute, a group ID attribute, or an organizational ID attribute obtained from the network entity.

37. The apparatus of claim 24, wherein the means for enforcing the a security policy drops the additional packet if the additional packet violates the security policy.

38. The apparatus of claim 37, wherein the additional packet violates the security policy if the session information includes a particular application protocol session type.

39. The apparatus of claim 24, wherein the means for enforcing a security policy includes reporting the application session.

40. The apparatus of claim 24, wherein the additional packet violates the security policy if the session information includes a particular type of metadata.

41. The apparatus of claim 24, wherein the additional packet violates the security policy if the session information includes metadata that matches particular data content.

42. The apparatus of claim 24, wherein the additional packet violates the security policy if the session information includes a particular source address.

43. The apparatus of claim 24, wherein the additional packet violates the security policy if the session information includes a particular destination address.

* * * * *